(12) United States Patent
Varkey et al.

(10) Patent No.: US 9,140,115 B2
(45) Date of Patent: *Sep. 22, 2015

(54) METHODS OF USING ENHANCED WELLBORE ELECTRICAL CABLES

(71) Applicant: Schlumberger Technology Corporation, Sugar Land, TX (US)

(72) Inventors: Joseph Varkey, Sugar Land, TX (US); Byong Jun Kim, Sugar Land, TX (US); Garud Sridhar, Sugar Land, TX (US); Wayne Fulin, Sugar Land, TX (US); Noor F. Sait, Atyrau (KZ); Matthew Billingham, Houston, TX (US); Andrea Sbordone, Costa Del Sol (SG)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/462,466

(22) Filed: Aug. 18, 2014

(65) Prior Publication Data

US 2014/0352952 A1   Dec. 4, 2014

Related U.S. Application Data

(63) Continuation of application No. 13/857,561, filed on Apr. 5, 2013, now Pat. No. 8,807,225, which is a continuation of application No. 12/252,553, filed on Oct. 16, 2008, now Pat. No. 8,413,723, which is a (Continued)

(51) Int. Cl.
*E21B 19/00* (2006.01)
*E21B 47/12* (2012.01)
(Continued)

(52) U.S. Cl.
CPC ............... *E21B 47/121* (2013.01); *D07B 1/147* (2013.01); *E21B 17/206* (2013.01); *E21B 19/22* (2013.01);

(Continued)

(58) Field of Classification Search
CPC ....... E21B 17/206; E21B 19/22; H01B 7/046; H02G 1/10; D07B 1/147
USPC ............... 166/339, 351, 352, 367, 77.1, 77.2, 166/241.5; 174/102 R, 103, 105 R, 107, 108
See application file for complete search history.

(56) References Cited

U.S. PATENT DOCUMENTS 1,948,439 A    2/1934  Budscheid
2,576,227 A *  11/1951 Hutchins, Jr. .......... 174/110 PM
(Continued)

FOREIGN PATENT DOCUMENTS

EP    0003104 A1    7/1979
EP    0471600 B1    3/1996
(Continued)

OTHER PUBLICATIONS

Salama, M. M. A., "Instructional Design of Multi-Layer Insulation of Power Cables", Transaction on Power Systems, Feb. 1992, vol. 7(1): pp. 377-382.

(Continued)

*Primary Examiner* — Matthew Buck
(74) *Attorney, Agent, or Firm* — Trevor Grove

(57) ABSTRACT

A method of deploying a cable into a wellbore penetrating a subterranean formation that includes providing a cable. The cable includes an insulated conductor; an armor wire layer surrounding the insulated conductor; and a polymeric material disposed in interstitial spaces formed between armor wires forming the armor wire layer, and in interstitial spaces formed between the at least one armor wire layer and the at least one insulated conductor. The method also includes introducing the cable into a wellbore and performing at least one operation in the wellbore utilizing the cable.

14 Claims, 14 Drawing Sheets

Related U.S. Application Data continuation-in-part of application No. 11/813,755, filed as application No. PCT/IB2006/050119 on Mar. 13, 2008, now Pat. No. 7,586,042, which is a continuation of application No. 11/033,698, filed on Jan. 12, 2005, now Pat. No. 7,170,007.

(60) Provisional application No. 60/985,771, filed on Nov. 6, 2007, provisional application No. 60/980,340, filed on Oct. 16, 2007.

(51) Int. Cl.
| | |
|---|---|
| *E21B 17/20* | (2006.01) |
| *H01B 7/04* | (2006.01) |
| *H02G 1/10* | (2006.01) |
| *E21B 19/22* | (2006.01) |
| *E21B 43/26* | (2006.01) |
| *E21B 47/00* | (2012.01) |
| *D07B 1/14* | (2006.01) |

(52) U.S. Cl.
CPC .............. *E21B 43/26* (2013.01); *E21B 47/00* (2013.01); *E21B 47/0001* (2013.01); *H01B 7/046* (2013.01); *H02G 1/10* (2013.01)

(56) References Cited

U.S. PATENT DOCUMENTS

| | | | |
|---|---|---|---|
| 2,604,509 A | 7/1952 | Blanchard | |
| 3,115,542 A | 12/1963 | Palandri et al. | |
| 3,217,083 A | 11/1965 | Gore | |
| 3,313,346 A | 4/1967 | Cross | |
| 3,328,140 A | 6/1967 | Warren | |
| 3,346,045 A | 10/1967 | Knapp et al. | |
| 3,482,034 A | 12/1969 | Rhoades et al. | |
| 3,490,125 A | 1/1970 | Frieling, Jr. | |
| 3,634,607 A * | 1/1972 | Coleman | 174/120 R |
| 3,679,812 A | 7/1972 | Owens | |
| 3,681,514 A | 8/1972 | Rhoades et al. | |
| 3,710,859 A | 1/1973 | Hanes et al. | |
| 3,758,704 A | 9/1973 | Naud | |
| 3,766,307 A | 10/1973 | Andrews | |
| 4,016,942 A | 4/1977 | Wallis, Jr. et al. | |
| 4,059,951 A | 11/1977 | Roe | |
| 4,077,022 A | 2/1978 | Pitts, Jr. | |
| 4,131,757 A | 12/1978 | Felkel | |
| 4,131,758 A | 12/1978 | Felkel | |
| 4,197,423 A * | 4/1980 | Fusen | 174/107 |
| 4,250,351 A | 2/1981 | Bridges | |
| 4,281,716 A | 8/1981 | Hall | |
| 4,292,588 A | 9/1981 | Smith | |
| 4,409,431 A | 10/1983 | Neuroth | |
| 4,486,252 A | 12/1984 | Lloyd | |
| 4,522,464 A * | 6/1985 | Thompson et al. | 385/107 |
| 4,523,804 A * | 6/1985 | Thompson | 385/107 |
| 4,525,813 A | 6/1985 | Burrage | |
| 4,547,774 A | 10/1985 | Gould | |
| 4,577,693 A | 3/1986 | Graser | |
| 4,606,604 A * | 8/1986 | Soodak | 385/113 |
| 4,644,094 A | 2/1987 | Hoffman | |
| 4,645,298 A | 2/1987 | Gartside | |
| 4,673,041 A | 6/1987 | Turner et al. | |
| 4,675,474 A | 6/1987 | Neuroth | |
| 4,696,542 A | 9/1987 | Thompson | |
| 4,722,589 A | 2/1988 | Priaroggia | |
| 4,743,711 A | 5/1988 | Hoffman | |
| 4,762,180 A | 8/1988 | Wybro et al. | |
| 4,768,984 A | 9/1988 | Oliveira et al. | |
| 4,825,953 A | 5/1989 | Wong et al. | |
| 4,830,113 A | 5/1989 | Geyer | |
| 4,899,823 A | 2/1990 | Cobb et al. | |
| 4,952,012 A * | 8/1990 | Stamnitz | 385/101 |
| 4,979,795 A | 12/1990 | Mascarenhas | |
| 4,986,360 A | 1/1991 | Laky et al. | |
| 4,993,492 A * | 2/1991 | Cressey et al. | 166/339 |
| 5,002,130 A | 3/1991 | Laky | |
| 5,088,559 A * | 2/1992 | Taliaferro | 166/379 |
| 5,125,061 A * | 6/1992 | Marlier et al. | 385/101 |
| 5,125,062 A * | 6/1992 | Marlier et al. | 385/101 |
| 5,150,443 A * | 9/1992 | Wijnberg | 385/107 |
| 5,329,605 A | 7/1994 | Wargotz | |
| 5,339,378 A | 8/1994 | Simonds et al. | |
| 5,431,759 A | 7/1995 | Neuroth | |
| 5,495,547 A * | 2/1996 | Rafie et al. | 385/101 |
| 5,778,981 A | 7/1998 | Head | |
| 5,787,217 A * | 7/1998 | Traut et al. | 385/106 |
| 5,857,523 A | 1/1999 | Edwards | |
| 5,894,104 A * | 4/1999 | Hedberg | 174/36 |
| 6,015,013 A | 1/2000 | Edwards et al. | |
| 6,030,255 A | 2/2000 | Konishi et al. | |
| 6,053,252 A | 4/2000 | Edwards | |
| 6,060,662 A | 5/2000 | Rafie et al. | |
| 6,116,345 A | 9/2000 | Fontana et al. | |
| 6,161,619 A | 12/2000 | Head | |
| 6,182,765 B1 | 2/2001 | Kilgore | |
| 6,195,487 B1 | 2/2001 | Anderson et al. | |
| 6,211,467 B1 | 4/2001 | Berelsman et al. | |
| 6,276,456 B1 | 8/2001 | Head | |
| 6,386,290 B1 * | 5/2002 | Headworth | 166/346 |
| 6,403,889 B1 | 6/2002 | Mehan et al. | |
| 6,442,304 B1 | 8/2002 | Crawley et al. | |
| 6,484,806 B2 * | 11/2002 | Childers et al. | 166/351 |
| 6,488,093 B2 | 12/2002 | Moss | |
| 6,555,752 B2 * | 4/2003 | Dalrymple et al. | 174/102 R |
| 6,559,383 B1 | 5/2003 | Martin | |
| 6,559,385 B1 | 5/2003 | Johnson et al. | |
| 6,600,108 B1 | 7/2003 | Mydur et al. | |
| 6,631,095 B1 * | 10/2003 | Bryant et al. | 367/20 |
| 6,659,180 B2 | 12/2003 | Moss | |
| 6,675,888 B2 | 1/2004 | Schempf et al. | |
| 6,691,775 B2 * | 2/2004 | Headworth | 166/77.2 |
| 6,745,840 B2 * | 6/2004 | Headworth | 166/346 |
| 6,747,213 B2 | 6/2004 | Bonicel | |
| 6,763,889 B2 * | 7/2004 | Rytlewski et al. | 166/338 |
| 6,776,195 B2 * | 8/2004 | Blasko et al. | 138/141 |
| 6,807,988 B2 * | 10/2004 | Powell et al. | 138/125 |
| 6,834,724 B2 * | 12/2004 | Headworth | 166/384 |
| 6,843,321 B2 * | 1/2005 | Carlsen | 166/355 |
| 6,919,512 B2 | 7/2005 | Guven et al. | |
| 7,000,903 B2 | 2/2006 | Piecyk et al. | |
| 7,116,283 B2 | 10/2006 | Benson et al. | |
| 7,139,218 B2 | 11/2006 | Hall et al. | |
| 7,170,007 B2 | 1/2007 | Varkey et al. | |
| 7,188,406 B2 | 3/2007 | Varkey et al. | |
| 7,235,743 B2 | 6/2007 | Varkey | |
| 7,282,644 B1 | 10/2007 | Alvey | |
| 7,326,854 B2 | 2/2008 | Varkey | |
| 7,402,753 B2 | 7/2008 | Varkey et al. | |
| 7,462,781 B2 | 12/2008 | Varkey et al. | |
| 7,465,876 B2 | 12/2008 | Varkey | |
| 7,586,042 B2 * | 9/2009 | Varkey et al. | 174/102 R |
| 7,700,880 B2 | 4/2010 | Varkey et al. | |
| 7,719,283 B2 | 5/2010 | Ishikawa et al. | |
| 7,730,936 B2 | 6/2010 | Hernandez-Solis et al. | |
| 7,798,234 B2 * | 9/2010 | Ju et al. | 166/367 |
| 7,845,412 B2 | 12/2010 | Sbordone et al. | |
| 8,227,697 B2 | 7/2012 | Varkey et al. | |
| 8,387,701 B2 | 3/2013 | Sbordone | |
| 8,413,723 B2 * | 4/2013 | Varkey et al. | 166/339 |
| 8,807,225 B2 * | 8/2014 | Varkey et al. | 166/339 |
| 2003/0011489 A1 | 1/2003 | Viswanathan | |
| 2003/0163179 A1 | 8/2003 | Hoglund et al. | |
| 2004/0163822 A1 | 8/2004 | Zhang et al. | |
| 2004/0262027 A1 | 12/2004 | Kaczmarski | |
| 2005/0217844 A1 | 10/2005 | Edwards et al. | |
| 2005/0219063 A1 | 10/2005 | Viswanathan et al. | |
| 2006/0151194 A1 * | 7/2006 | Varkey et al. | 174/102 R |
| 2006/0187084 A1 | 8/2006 | Hernandez-Marti et al. | |
| 2006/0221768 A1 | 10/2006 | Hall et al. | |
| 2006/0242824 A1 * | 11/2006 | Varkey et al. | 29/825 |
| 2007/0003780 A1 | 1/2007 | Varkey et al. | |
| 2007/0044991 A1 | 3/2007 | Varkey | |
| 2007/0158095 A1 | 7/2007 | Sridhar et al. | |

(56) References Cited

U.S. PATENT DOCUMENTS

| | | |
|---|---|---|
| 2008/0083533 A1 | 4/2008 | Malone et al. |
| 2008/0156517 A1 | 7/2008 | Varkey et al. |
| 2008/0190612 A1 | 8/2008 | Buchanan |
| 2009/0194296 A1 | 8/2009 | Gillan et al. |
| 2010/0038112 A1 | 2/2010 | Grether |
| 2010/0263904 A1 | 10/2010 | Varkey et al. |
| 2012/0222869 A1 | 9/2012 | Varkey |

FOREIGN PATENT DOCUMENTS

| | | |
|---|---|---|
| EP | 1216342 A1 | 6/2002 |
| EP | 2039878 A1 | 3/2009 |
| EP | 2039878 B1 | 8/2010 |
| FR | 2767861 A1 | 3/1999 |
| GB | 2234772 A | 2/1991 |
| JP | 54007186 A | 1/1979 |
| JP | 2216710 A | 8/1990 |
| WO | 9948111 A1 | 9/1999 |
| WO | 02071178 A2 | 9/2002 |
| WO | 2006003362 A1 | 1/2006 |
| WO | 2006027553 A1 | 3/2006 |
| WO | 2006088372 A1 | 8/2006 |
| WO | 2007034242 A1 | 3/2007 |

OTHER PUBLICATIONS

Lebedev, S. M., "The Breakdown Strength of Two-Layer Dielectrics", Tomsk Polytechnic University, Tomsk, Russia #4.304.P2, High Voltage Engineering Symposium, Aug. 1999.

* cited by examiner

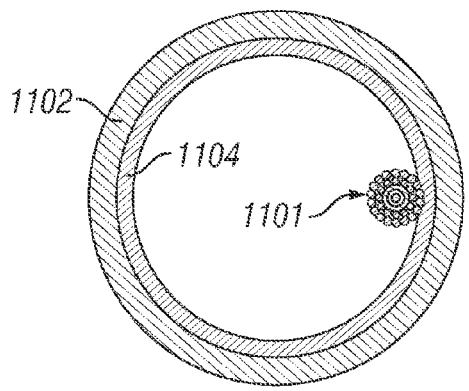
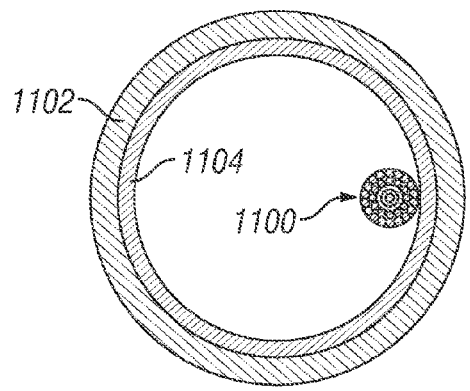
FIG. 11A  FIG. 11B
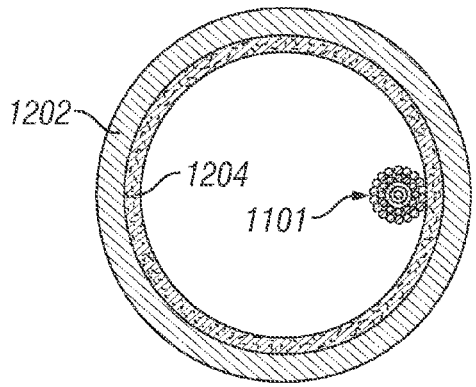
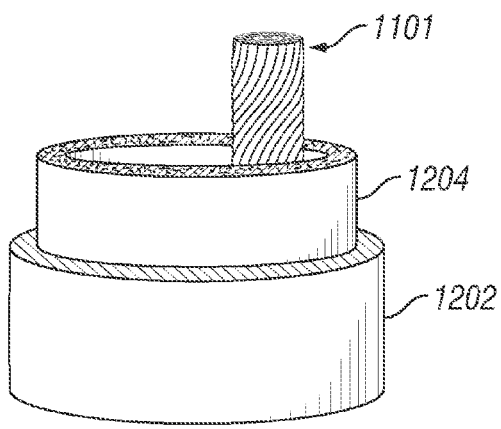
FIG. 12A  FIG. 12B

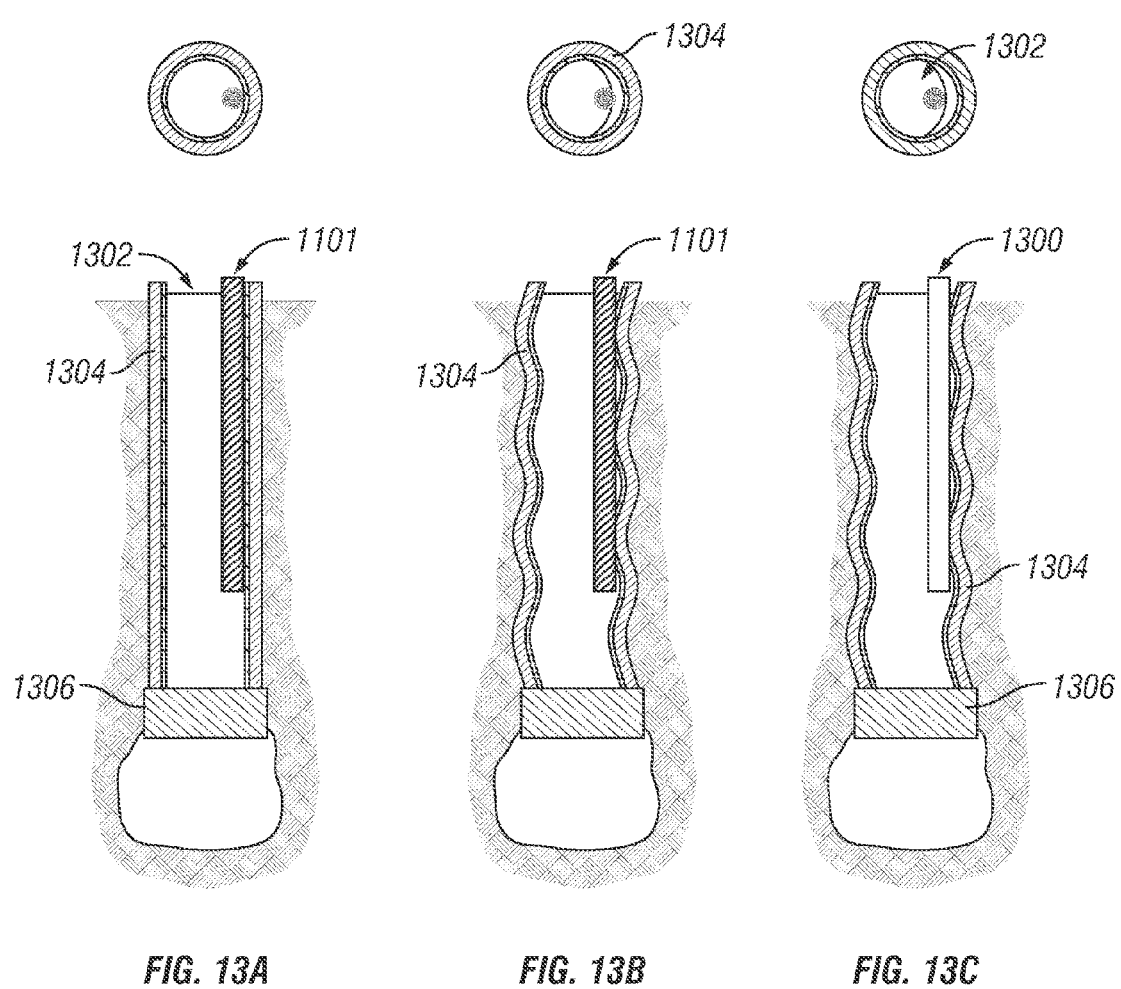
*FIG. 13A*     *FIG. 13B*     *FIG. 13C*

METHODS OF USING ENHANCED WELLBORE ELECTRICAL CABLES

CROSS-REFERENCE TO RELATED APPLICATION

This application is a continuation of prior copending application Ser. No. 13/857,561 entitled "Methods Of Using Enhanced Electrical Cables" filed Apr. 5, 2013, now U.S. Pat. No. 8,807,225, which is a continuation application of prior copending application Ser. No. 12/252,553 entitled "Methods Of Using Enhanced Electrical Cables" filed Oct. 16, 2008, now U.S. Pat. No. 8,413,723, which was a continuation-in-part application of prior copending application Ser. No. 11/813,755 entitled "Enhanced Wellbore Electrical Cables" filed Mar. 13, 2008, now U.S. Pat. No. 7,586,042, which was the PCT National Stage application of International Patent Application No. PCT/IB2006/050119, which claims priority to application Ser. No. 11/033,698 entitled "Enhanced Electrical Cables" filed Jan. 12, 2005, now U.S. Pat. No. 7,170,007, the entire disclosures of which are incorporated herein by reference and claims priority to the filing dates thereof.

Furthermore, prior co-pending application Ser. No. 12/252,553 entitled "Methods Of Using Enhanced Electrical Cables" filed Oct. 16, 2008, now U.S. Pat. No. 8,413,723 claimed benefit of and priority to provisional patent applications 60/980,340 filed Oct. 16, 2007, and 60/985,771 filed Nov. 6, 2007 the entire disclosures of which are incorporated herein by reference and this application claims priority to the filing dates thereof.

BACKGROUND OF THE INVENTION

The statements in this section merely provide background information related to the present disclosure and may not constitute prior art. Embodiments of the present invention relates generally to wellbore cables.

Embodiments of the invention relate to wellbore electric cables, and methods of using such cables. In one aspect, the invention relates to a durable and sealed torque balanced enhanced electric cable used with wellbore devices to analyze geologic formations adjacent a wellbore, methods of manufacturing same, as well as uses of such cables.

Generally, geologic formations within the earth that contain oil and/or petroleum gas have properties that may be linked with the ability of the formations to contain such products. For example, formations that contain oil or petroleum gas have higher electrical resistivity than those that contain water. Formations generally comprising sandstone or limestone may contain oil or petroleum gas. Formations generally comprising shale, which may also encapsulate oil-bearing formations, may have porosities much greater than that of sandstone or limestone, but, because the grain size of shale is very small, it may be very difficult to remove the oil or gas trapped therein. Accordingly, it may be desirable to measure various characteristics of the geologic formations adjacent to a well before completion to help in determining the location of an oil- and/or petroleum gas-bearing formation as well as the amount of oil and/or petroleum gas trapped within the formation.

Logging tools, which are generally long, pipe-shaped devices, may be lowered into the well to measure such characteristics at different depths along the well. These logging tools may include gamma-ray emitters/receivers, caliper devices, resistivity-measuring devices, neutron emitters/receivers, and the like, which are used to sense characteristics of the formations adjacent the well. A wireline cable connects the logging tool with one or more electrical power sources and data analysis equipment at the earth's surface, as well as providing structural support to the logging tools as they are lowered and raised through the well. Generally, the wireline cable is spooled out of a truck, over a pulley, and down into the well.

Wireline cables are typically formed from a combination of metallic conductors, insulative material, filler materials, jackets, and metallic armor wires. Commonly, the useful life of a wellbore electric cable is typically limited to only about 6 to 24 months, as the cable may be compromised by exposure to extremely corrosive elements, or little or no maintenance of cable strength members, such as armor wires. A primary factor limiting wireline cable life is armor wire failure, where fluids present in the downhole wellbore environment lead to corrosion and failure of the armor wires.

Armor wires are typically constructed of cold-drawn pearlitic steel coated with zinc for corrosion protection. While zinc protects the steel at moderate temperatures, it is known that corrosion is readily possible at elevated temperatures and certain environmental conditions. Although the cable core may still be functional, it is generally not economically feasible to replace the armor wire, and the entire cable must be discarded. Once corrosive fluids infiltrate into the annular gaps, it is difficult or impossible to completely remove them. Even after the cable is cleaned, the corrosive fluids remain in interstitial spaces damaging the cable. As a result, cable corrosion is essentially a continuous process which may begin with the wireline cable's first trip into the well. Once the armor wire begins to corrode, strength is quickly lost, and the entire cable must be replaced. Armor wires in wellbore electric cables are also associated with several operational problems including torque imbalance between armor wire layers, difficult-to-seal uneven outer profiles, and loose or broken armor wires.

In wells with surface pressures, the electric cable is run through one or several lengths of piping packed with grease, also known as flow tubes, to seal the gas pressure in the well while allowing the wireline to travel in and out of the well. Because the armor wire layers have unfilled annular gaps or interstitial spaces, dangerous gases from the well can migrate into and travel through these gaps upward toward lower pressure. This gas tends to be held in place as the wireline travels through the grease-packed piping. As the wireline goes over the upper sheave at the top of the piping, the armor wires may spread apart, or separate, slightly and the pressurized gas is released, where it becomes a fire or explosion hazard. Further, while the cables with two layers of armor wires are under tension, the inner and outer armor wires, generally cabled at opposite lay angles, rotate slightly in opposite directions, causing torque imbalance problems. To create a torque-balanced cable, inner armor wires would have to be somewhat larger than outer armor wires, but the smaller outer wires would quickly fail due to abrasion and exposure to corrosive fluids. Therefore, larger armor wires are placed at the outside of the wireline cable, which results in torque imbalance.

Armored wellbore cables may also wear due to point-to-point contact between armor wires. Point-to-point contact wear may occur between the inner and outer armor wire layers, or oven side-to-side contact between armor wires in the same layer. While under tension and when cables go over sheaves, radial loading causes point loading between outer and inner armor wires. Point loading between armor wire layers removes the zinc coating and cuts groves in the inner and outer armor wires at the contact points. This causes strength reduction, leads to premature corrosion and may accelerate cable fatigue failure. Also, due to annular gaps or interstitial spaces between the inner armor wires and the cable core, as the wireline cable is under tension the cable core materials tend to creep thus reducing cable diameter and causing linear stretching of the cable as well as premature electrical shorts.

It is commonplace that as wellbore electrical cables are lowered into an unobstructed well, the tool string rotates to relieve torque in the cable. When the tool string becomes stuck in the well (for example, at an obstruction, or at a bend in a deviated well) the cable tension is typically cycled until the cable can continue up or down the hole. This bouncing motion creates rapidly changing tension and torque, which can cause several problems. The sudden changes in tension can cause tension differentials along the cables length, causing the armor wires to "birdcage." Slack cable can also loop around itself and form a knot in the wireline cable. Also, for wellbore cables, it is a common solution to protect armor wire by "caging." In caging designs, a polymer jacket is applied over the outer armor wire. A jacket applied directly over a standard outer layer of armor wires, which is essentially a sleeve. This type of design has several problems, such as, when the jacket is damaged, harmful well fluids enter and are trapped between the jacket and the armor wire, causing corrosion, and since damage occurs beneath the jacket, it may go unnoticed until a catastrophic failure.

Also, during wellbore operations, such as logging, in deviated wells, wellbore cables make significant contact with the wellbore surface. The spiraled ridges formed by the cables' armor wire commonly erode a groove in the side of the wellbore, and as pressure inside the well tends to be higher than pressure outside the well, the cable is prone to stick into the formed groove. Further, the action of the cable contacting and moving against the wellbore wall may remove the protective zinc coating from the armor wires, causing corrosion at an increased rate, thereby reducing the cable life.

Thus, a need exists for wellbore electric cables that prevent wellbore gas migration and escape, are torque-resistant with a durable jacket that resist stripping, bulging, cut-through, corrosion, abrasion, avoids the problems of birdcaging, armor wire milking due to high armor, looping and knotting, and are stretch-resistant, crush-resistant as well as being resistant to material creep and differential sticking. An electrical cable that can overcome one or more of the problems detailed above while conducting larger amounts of power with significant data signal transmission capability would be highly desirable, and the need is met at least in part by the following invention.

SUMMARY

An embodiment of a method of deploying a cable into a wellbore penetrating a subterranean formation includes providing a cable. The cable includes an insulated conductor; an armor wire layer surrounding the insulated conductor; and a polymeric material disposed in interstitial spaces formed between armor wires forming the armor wire layer, and in interstitial spaces formed between the at least one armor wire layer and the at least one insulated conductor. The method also includes introducing the cable into a wellbore; and performing at least one operation in the wellbore utilizing the cable.

BRIEF DESCRIPTION OF THE DRAWINGS

These and other features and advantages of the present invention will be better understood by reference to the following detailed description when considered in conjunction with the accompanying drawings wherein:

FIGS. 11a and 11b are schematic cross-sectional views of cables disposed in a wellbore tubing having a coating on an interior diameter thereof.

FIGS. 12a and 12b are schematic cross-sectional and perspective views, respectively, of a cable disposed in a wellbore tubing having lining inserted therein.

FIGS. 13a, 13b, and 13c are schematic radial and axial cross-sectional views, respectively, of a cable disposed in a wellbore having wellbore tubing.

DETAILED DESCRIPTION

Figure 1:
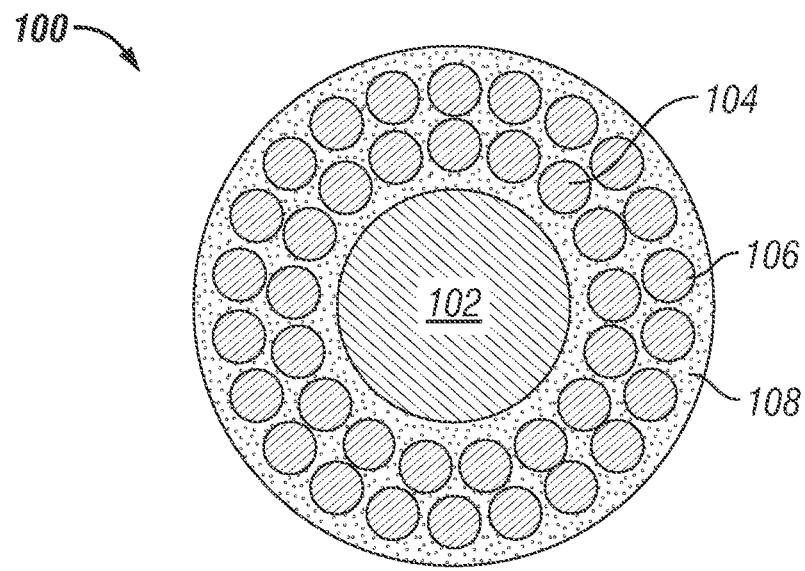
FIG. 1 is stylized a cross-sectional generic representation of cables according to the invention.

Illustrative embodiments are described below. In the interest of clarity, not all features of an actual implementation are described in this specification. It will of course be appreciated that in the development of any such actual embodiment, numerous implementation-specific decisions must be made to achieve the developers specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

Embodiments of the invention relate to wellbore cables as well as uses thereof. In one aspect, the invention relates to an enhanced electrical cables used with devices to analyze geologic formations adjacent a wellbore, methods of manufacturing the same, and uses of the cables in seismic and wellbore operations. Cables according to the invention described herein are enhanced and provide such benefits as wellbore gas migration and escape prevention, as well as torque-resistant cables with durable jackets that resist stripping, bulging, cut-through, corrosion, and abrasion. It has been discovered that protecting armor wires with durable jacket materials that contiguously extend from the cable core to a smooth outer jacket provides an excellent sealing surface which is torque balanced and significantly reduces drag. Operationally, cables according to the invention eliminate the problems of fires or explosions due to wellbore gas migration and escape through the armor wiring, birdcaging, stranded armors, armor wire milking due to high armor, and looping and knotting. Cables are also stretch-resistant, crush-resistant as well as resistant to material creep and differential sticking.

Cables generally include at least one insulated conductor, least one layer of armor wires surrounding the insulated conductor, and a polymeric material disposed in the interstitial spaces formed between armor wires and the interstitial spaces formed between the armor wire layer and insulated conductor. Insulated conductors useful in the embodiments of the invention include metallic conductors encased in an insulated jacket. Any suitable metallic conductors may be used. Examples of metallic conductors include, but are not necessarily limited to, copper, nickel coated copper, or aluminum. Preferred metallic conductors are copper conductors. While any suitable number of metallic conductors may be used in forming the insulated conductor, preferably from 1 to about 60 metallic conductors are used, more preferably 7, 19, or 37 metallic conductors. Insulated jackets may be prepared from any suitable materials known in the art. Examples of suitable insulated jacket materials include, but are not necessarily limited to, polytetrafluoroethylene-perfluoromethylvinylether polymer (MFA), perfluoro-alkoxyalkane polymer (PFA), polytetrafluoroethylene polymer (PTFE), ethylene-tetrafluoroethylene polymer (ETFE), ethylene-propylene copolymer (EPC), poly(4-methyl-1-pentene) (TPX® available from Mitsui Chemicals, Inc.), other polyolefins, other fluoropolymers, polyaryletherether ketone polymer (PEEK), polyphenylene sulfide polymer (PPS), modified polyphenylene sulfide polymer, polyether ketone polymer (PEK), maleic anhydride modified polymers, Parmax® SRP polymers (self-reinforcing polymers manufactured by Mississippi Polymer Technologies, Inc based on a substituted poly (1,4-phenylene) structure where each phenylene ring has a substituent R group derived from a wide variety of organic groups), or the like, and any mixtures thereof.

In some embodiments of the invention, the insulated conductors are stacked dielectric insulated conductors, with electric field suppressing characteristics, such as those used in the cables described in U.S. Pat. No. 6,600,108 (Mydur, et al.), hereinafter incorporated by reference in its entirety. Such stacked dielectric insulated conductors generally include a first insulating jacket layer disposed around the metallic conductors wherein the first insulating jacket layer has a first relative permittivity, and, a second insulating jacket layer disposed around the first insulating jacket layer and having a second relative permittivity that is less than the first relative permittivity. The first relative permittivity is within a range of about 2.5 to about 10.0, and the second relative permittivity is within a range of about 1.8 to about 5.0.

Some cables used are those described U.S. Pat. No. 7,462,781, incorporated herein by reference in its entirety, and include at least one layer of armor wires surrounding the insulated conductor. The armor wires may be generally made of any high tensile strength material including, but not necessarily limited to, galvanized improved plow steel, alloy steel, or the like. In preferred embodiments of the invention, cables comprise an inner armor wire layer surrounding the insulated conductor and an outer armor wire layer served around the inner armor wire layer. A protective polymeric coating may be applied to each strand of armor wire for corrosion protection or even to promote bonding between the armor wire and the polymeric material disposed in the interstitial spaces. As used herein, the term bonding is meant to include chemical bonding, mechanical bonding, or any combination thereof. Examples of coating materials which may be used include, but are not necessarily limited to, fluoropolymers, fluorinated ethylene propylene (FEP) polymers, ethylene-tetrafluoroethylene polymers (Tefzel®), perfluoro-alkoxyalkane polymer (PFA), polytetrafluoroethylene polymer (PTFE), polytetrafluoroethylene-perfluoromethylvinylether polymer (MFA), polyaryletherether ketone polymer (PEEK), or polyether ketone polymer (PEK) with fluoropolymer combination, polyphenylene sulfide polymer (PPS), PPS and PTFE combination, latex or rubber coatings, and the like. Each armor wire may also be plated with materials for corrosion protection or even to promote bonding between the armor wire and polymeric material. Nonlimiting examples of suitable plating materials include brass, copper alloys, and the like. Plated armor wires may even cords such as tire cords. While any effective thickness of plating or coating material may be used, a thickness from about 10 microns to about 100 microns is preferred.

Figures 20A, 20B:
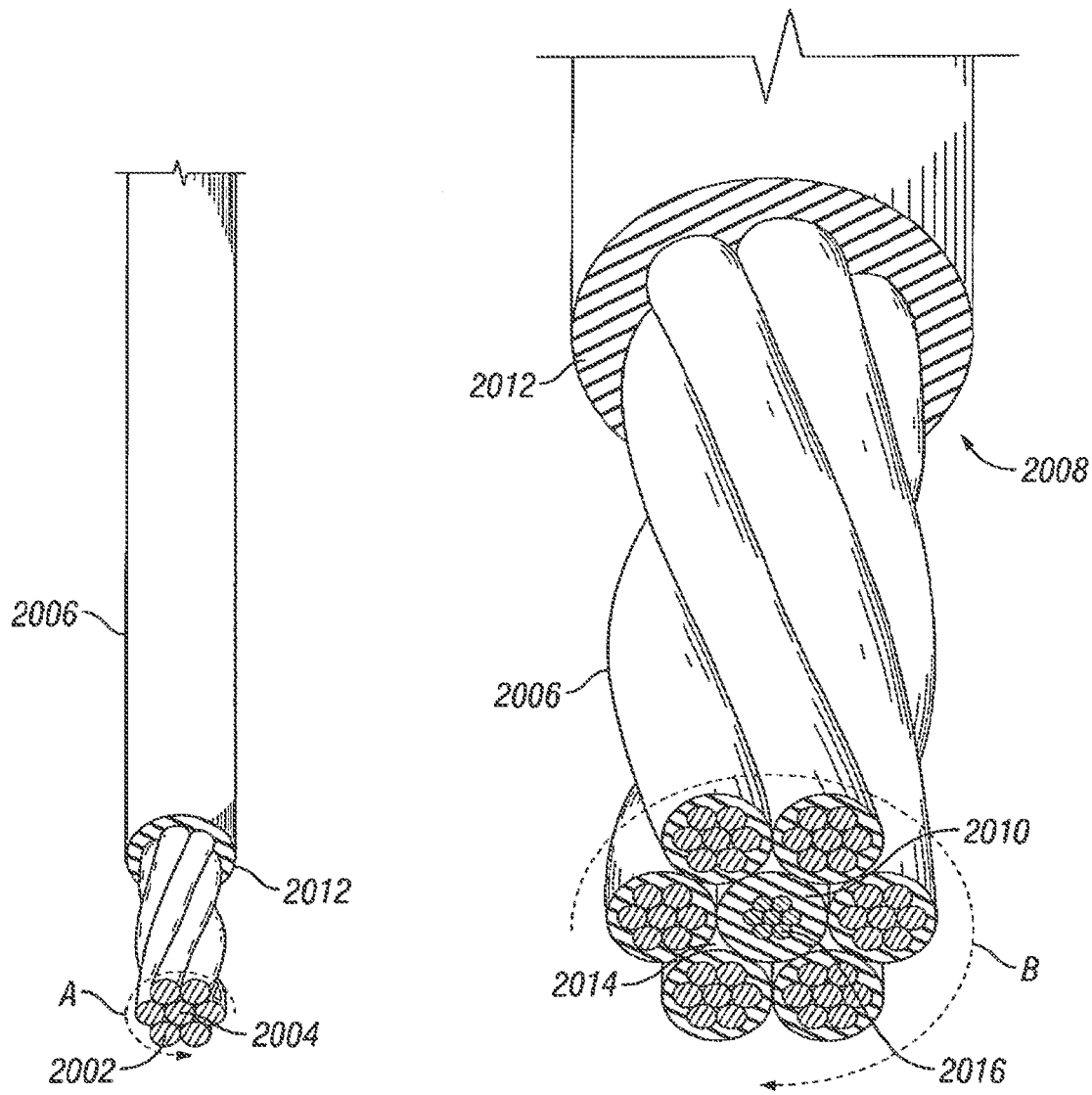
FIGS. 20A and 20B illustrate one embodiment where individual filaments are stranded together at a counter-rotational angle relative to the orientation of strength members forming cable.

In some other embodiments, cables have armor wires which are strength members formed of a plurality of stranded filaments. The term "filament" as used herein means a single continuous metallic wire which runs the length of the cable in which it is used to form, and should be consider the equivalent of an armor wire unless otherwise indicated. A plurality of filaments is bundled to form a "strength member" and may include a polymer jacket encasing the filaments. The strength members may be used as a central strength member, or even layered around a central axially positioned component or strength member, to form a layer of strength members. More than one layer of strength members may be formed as well. Further, when electrically conductive filaments are used in forming the strength member, if the strength member is of high enough electrical conductance, it may be used for conducting electricity. As illustrated in FIGS. 20A and 20B, which illustrates an embodiment of cables, such as those shown in the application U.S. Pat. No. 7,462,781, incorporated by reference in its entirety as noted above, individual filaments 2002 (only one indicated) may be helically stranded (bundled) together around a central filament 2004 at rotational direction A to form strength member 2006. The direction A is at a counter-rotational direction relative to the rotational orientation B in FIG. 20B for the plurality of helically bundled strength members 2006 (only one indicated) forming cable 2008, as the strength members are layered over central component 2010 of the cable 2008. Cable 2008 further includes a jacket 2012 containing the plurality of strength members 2006 and central component 2010, as well as a polymer jacket 2012 encasing the filaments 2002 2004 of strength member 2006. The lay angles of the filaments 2004 in the stranded filament strength members 2006, and the lay angles of the strength members 2006 as bundled to form cable 2008 can be adjusted for optimal torque balance. The polymeric materials used to form the jacket 2012 encasing the filaments 2002 2004 and the plurality of strength members 2006 (only one indicated in FIG. 20B) can be continuously bonded to hold the members in place. The polymer may be amended with short fibers to provide such benefits as added strength or abrasion resistance. A final, fiber-less polymer layer may be included to provide an optimal sealing surface which may also be tear and rip resistance.

For cables used, polymeric materials are disposed in the interstitial spaces formed between armor wires, and interstitial spaces formed between the armor wire layer and insulated conductor. While not particularly bound by any specific functioning theories, it is believed that disposing a polymeric material throughout the armor wires interstitial spaces, or unfilled annular gaps, among other advantages, prevents dangerous well gases from migrating into and traveling through these spaces or gaps upward toward regions of lower pressure, where it becomes a fire, or even explosion hazard. In embodiments of cables, the armor wires are partially or completely sealed by a polymeric material that completely fills all interstitial spaces, therefore eliminating any conduits for gas migration. Further, incorporating a polymeric material in the interstitial spaces provides torque balanced two armor wire layer cables, since the outer armor wires are locked in place and protected by a tough polymer jacket, and larger diameters are not required in the outer layer, thus mitigating torque balance problems. Additionally, since the interstitial spaces filled, corrosive downhole fluids cannot infiltrate and accumulate between the armor wires. The polymeric material may also serve as a filter for many corrosive fluids. By minimizing exposure of the armor wires and preventing accumulation of corrosive fluids, the useful life of the cable may be significantly greatly increased.

Also, filling the interstitial spaces between armor wires and separating the inner and outer armor wires with a polymeric material reduces point-to-point contact between the armor wires, thus improving strength, extending fatigue life, and while avoiding premature armor wire corrosion. Because the interstitial spaces are filled, the cable core is completely contained and creep is mitigated, and as a result, cable diameters are much more stable and cable stretch is significantly reduced. The creep-resistant polymeric materials used in this invention may minimize core creep in two ways: first, locking the polymeric material and armor wire layers together greatly reduces cable deformation; and secondly, the polymeric material also may eliminate any annular space into which the cable core might otherwise creep. Cables according to the invention may improve problems encountered with caged armor designs, since the polymeric material encapsulating the armor wires may be continuously bonded it cannot be easily stripped away from the armor wires. Because the processes used in this invention allow standard armor wire coverage (about 93-98% metal) to be maintained, cable strength may not be sacrificed in applying the polymeric material, as compared with typical caged armor designs.

The polymeric materials useful in the cables include, by nonlimiting example, polyolefins (such as EPC or polypropylene), other polyolefins, polyaryletherether ketone (PEEK), polyaryl ether ketone (PEK), polyphenylene sulfide (PPS), modified polyphenylene sulfide, polymers of ethylene-tetrafluoroethylene (ETFE), polymers of poly(1,4-phenylene), polytetrafluoroethylene (PTFE), perfluoroalkoxy (PFA) polymers, fluorinated ethylene propylene (FEP) polymers, polytetrafluoroethylene-perfluoromethylvinylether (MFA) polymers, Parmax®, and any mixtures thereof. Preferred polymeric materials are ethylene-tetrafluoroethylene polymers, perfluoroalkoxy polymers, fluorinated ethylene propylene polymers, and polytetrafluoroethylene-perfluoromethylvinylether polymers.

The polymeric material used in cables may be disposed contiguously from the insulated conductor to the outermost layer of armor wires, or may even extend beyond the outer periphery thus forming a polymeric jacket that completely encases the armor wires. The polymeric material forming the jacket and armor wire coating material may be optionally selected so that the armor wires are not bonded to and can move within the polymeric jacket.

In some embodiments, the polymeric material may not have sufficient mechanical properties to withstand high pull or compressive forces as the cable is pulled, for example, over sheaves, and as such, may further include short fibers. While any suitable fibers may be used to provide properties sufficient to withstand such forces, examples include, but are not necessarily limited to, carbon fibers, fiberglass, ceramic fibers, Kevlar® fibers, Vectran® fibers, quartz, nanocarbon, or any other suitable material. Further, as the friction for polymeric materials including short fibers may be significantly higher than that of the polymeric material alone, an outer jacket of polymeric material without short fibers may be placed around the outer periphery of the cable so the outer surface of cable has low friction properties.

The polymeric material used to form the polymeric jacket or the outer jacket of cables may also include particles which improve cable wear resistance as it is deployed in wellbores. Examples of suitable particles include Ceramer™, boron nitride, PTFE, graphite, nanoparticles (such as nanoclays, nanosilicas, nanocarbons, nanocarbon fibers, or other suitable nano-materials), or any combination of the above.

Embodiments of cables used may also have one or more armor wires replaced with coated armor wires. The coating may be comprised of the same material as those polymeric materials described hereinabove. This may help improve torque balance by reducing the strength, weight, or even size of the outer armor wire layer, while also improving the bonding of the polymeric material to the outer armor wire layer.

In some embodiments, cables are used that may comprise at least one filler rod component in the armor wire layer. In such cables, one or more armor wires are replaced with a filler rod component, which may include bundles of synthetic long fibers or long fiber yarns. The synthetic long fibers or long fiber yarns may be coated with any suitable polymers, including those polymeric materials described hereinabove. The polymers may be extruded over such fibers or yarns to promote bonding with the polymeric jacket materials. This may further provide stripping resistance. Also, as the filler rod components replace outer armor wires, torque balance between the inner and outer armor wire layers may further be enhanced.

Embodiments of methods use cables of any practical design, including monocables, coaxial cables, quadcables, heptacables, and the like. Cables which consist substantially of armor wires, formed of stranded filaments or otherwise, which have no significant purpose for conducting electricity, but rather are used for applying force downhole, may be used. In coaxial cable designs, a plurality of metallic conductors surround the insulated conductor, and are positioned about the same axis as the insulated conductor. Cables may have an outer diameter from about 1 mm to about 125 mm, and preferably, a diameter from about 2 mm to about 10 mm.

The materials forming the insulating layers and the polymeric materials used in the cables may further include a fluoropolymer additive, or fluoropolymer additives, in the material admixture to form the cable. Such additive(s) may be useful to produce long cable lengths of high quality at high manufacturing speeds. Suitable fluoropolymer additives include, but are not necessarily limited to, polytetrafluoroethylene, perfluoroalkoxy polymer, ethylene tetrafluoroethylene copolymer, fluorinated ethylene propylene, perfluorinated poly(ethylene-propylene), and any mixture thereof. The fluoropolymers may also be copolymers of tetrafluoroethylene and ethylene and optionally a third comonomer, copolymers of tetrafluoroethylene and vinylidene fluoride and optionally a third comonomer, copolymers of chlorotrifluoroethylene and ethylene and optionally a third comonomer, copolymers of hexafluoropropylene and ethylene and optionally third comonomer, and copolymers of hexafluoropropylene and vinylidene fluoride and optionally a third comonomer. The fluoropolymer additive should have a melting peak temperature below the extrusion processing temperature, and preferably in the range from about 200 degree Celsius to about 350 degrees Celsius. To prepare the admixture, the fluoropolymer additive is mixed with the insulating jacket or polymeric material. The fluoropolymer additive may be incorporated into the admixture in the amount of about 5% or less by weight based upon total weight of admixture, preferably about 1% by weight based or less based upon total weight of admixture, more preferably about 0.75% or less based upon total weight of admixture.

Referring now to FIG. 1, a cross-sectional generic representation of some cable embodiments according to the invention. The cables include a core 102 which comprises insulated conductors in such configurations as heptacables, monocables, coaxial cables, or even quadcables. A polymeric material 108 is contiguously disposed in the interstitial spaces formed between armor wires 104 and 106, and interstitial spaces formed between the armor wires 104 and core 102. The polymeric material 108 may further include short fibers. The inner armor wires 104 are evenly spaced when cabled around the core 102. The armor wires 104 and 106 may be coated armor wires as described herein above. The polymeric material 108 may extend beyond the outer armor wires 106 to form a polymeric jacket thus forming a polymeric encased cable 100.

In one method of preparing the cable 100, according to the invention, a first layer of polymeric material 108 is extruded upon the core insulated conductor(s) 102, and a layer of inner armor wires 104 are served thereupon. The polymeric material 108 is then softened, by heating for example, to allow the inner armor wires 104 to embed partially into the polymeric material 108, thereby eliminating interstitial gaps between the polymeric material 108 and the armor wires 104. A second layer of polymeric material 108 is then extruded over the inner armor wires 104 and may be bonded with the first layer of polymeric material 108. A layer of outer armor wires 106 are then served over the second layer of polymeric material 108. The softening process is repeated to allow the outer armor wires 106 to embed partially into the second layer of polymeric material 108, and removing any interstitial spaces between the inner armor wires 104 and outer armor wires 106. A third layer of polymeric material 108 is then extruded over the outer armor wires 106 embedded in the second layer of polymeric material 108, and may be bonded with the second layer of polymeric material 108.

Figure 2:
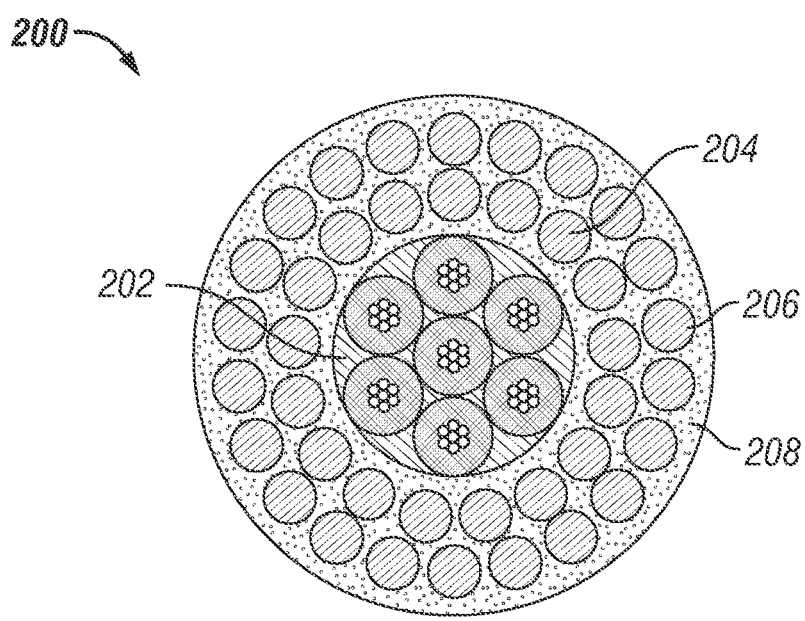
FIG. 2 is a stylized cross-sectional representation of a heptacable according to the invention.
Figure 3:
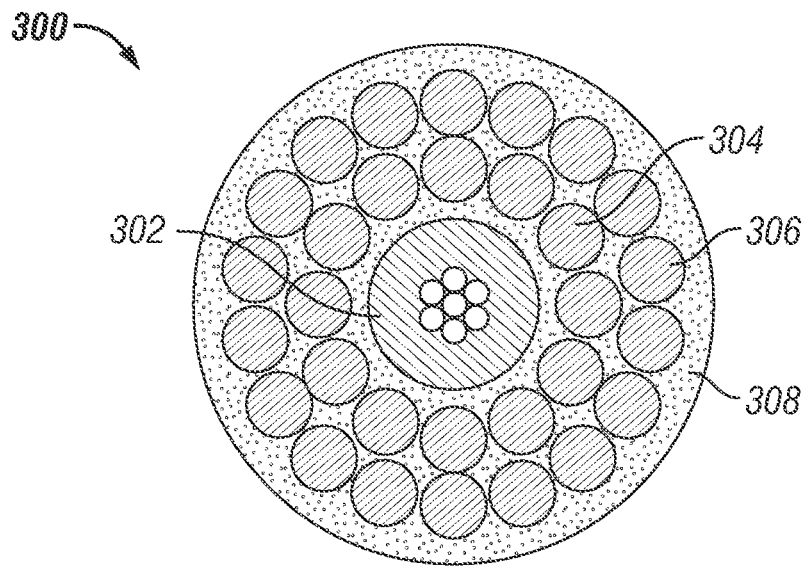
FIG. 3 is a stylized cross-sectional representation of a monocable according to the invention.

FIG. 2 illustrates a cross-sectional representation of a heptacable according to the invention. Similar to cable 100 illustrated in FIG. 1, the heptacable includes a core 202 comprised of seven insulated conductors in a heptacable configuration. A polymeric material 208 is contiguously disposed in the interstitial spaces formed between armor wires 204 and 206, and interstitial spaces formed between the armor wires 204 and heptacable core 202. The armor wires 204 and 206 may be coated armor wires as well. The polymeric material 208 may extend beyond the outer armor wires 206 to form a sealing polymeric jacket. Another cable embodiment of the invention is shown in FIG. 3, which is a cross-sectional representation of a monocable. The cable includes a monocable core 302, a single insulated conductor, which is surrounded with a polymeric material 308. The single insulated conductor is comprised of seven metallic conductors encased in an insulated jacket. The polymeric material is disposed about in the interstitial spaces formed between inner armor wires 304 and outer armor wires 306, and interstitial spaces formed between the inner armor wires 304 and insulated conductor 302. The polymeric material 308 may extend beyond the outer armor wires 306 to form a sealing polymeric jacket.

Figure 4:
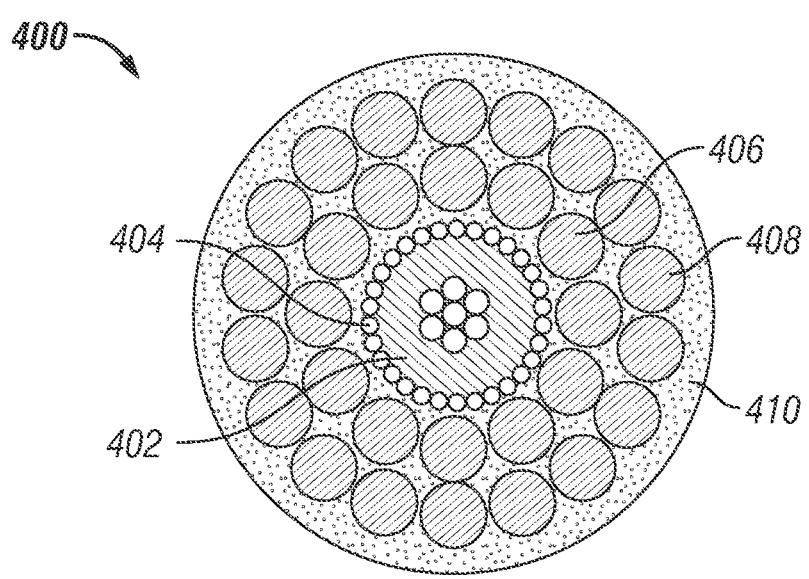
FIG. 4 is a stylized cross-sectional representation of a coaxial cable according to the invention.

FIG. 4 illustrates yet another embodiment of the invention, which is a coaxial cable. Cables according to this embodiment include an insulated conductor 402 at the core similar to the monocable insulated conductor 302 shown in FIG. 3. A plurality of metallic conductors 404 surround the insulated conductor, and are positioned about the same axis as the insulated conductor 402. A polymeric material 410 is contiguously disposed in the interstitial spaces formed between armor wires 406 and 408, and interstitial spaces formed between the armor wires 406 and plurality of metallic conductors 404. The inner armor wires 406 are evenly spaced. The armor wires 406 and 408 may be coated armor wires. The polymeric material 410 may extend beyond the outer armor wires 408 to form a polymeric jacket thus encasing and sealing the cable 400.

Figure 5:
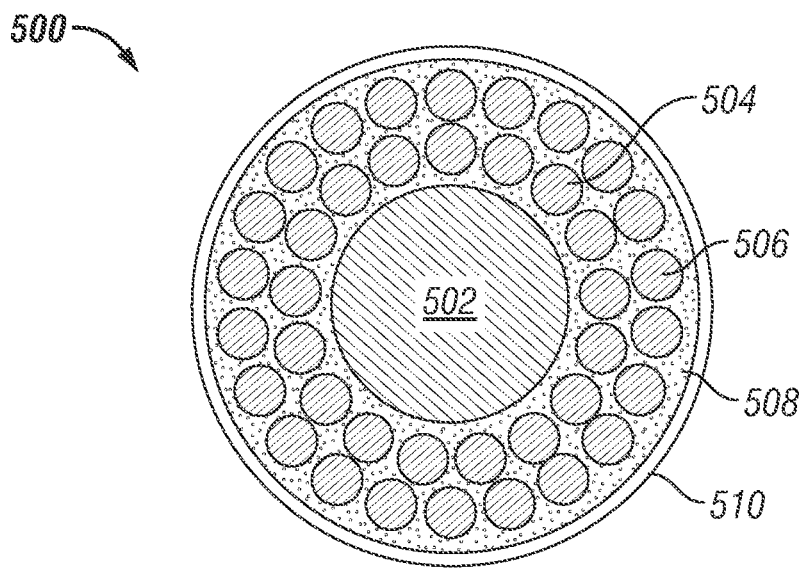
FIG. 5 is a cross-section illustration of a cable according to the invention which comprises an outer jacket formed from a polymeric material and where the outer jacket surrounds a polymeric material layer that includes short fibers.

In cable embodiments of the invention where the polymeric material extends beyond the outer periphery to form a polymeric jacket completely encasing the armor wires, the polymeric jacket is formed from a polymeric material as described above, and may further comprise short fibers and/or particles. Referring now to FIG. 5, a cable according to the invention which comprises an outer jacket, the cable 500 is comprised of a at least one insulated conductor 502 placed in the core position, a polymeric material 508 contiguously disposed in the interstitial spaces formed between armor wire layers 504 and 506, and interstitial spaces formed between the armor wires 504 and insulated conductor(s) 502. The polymeric material 508 extends beyond the outer armor wires 506 to form a polymeric jacket. The cable 500 further includes an outer jacket 510, which is bonded with polymeric material 508, and encases polymeric material 508, armor wires 504 and 506, as well as insulated conductor(s) 502. The outer jacket 510 is formed from a polymeric material, free of any fiber, but may contain particles as described hereinabove, so the outer surface of cable has low friction properties. Further, the polymeric material 508 may contain a short fiber to impart strength in the cable.

Figure 6:
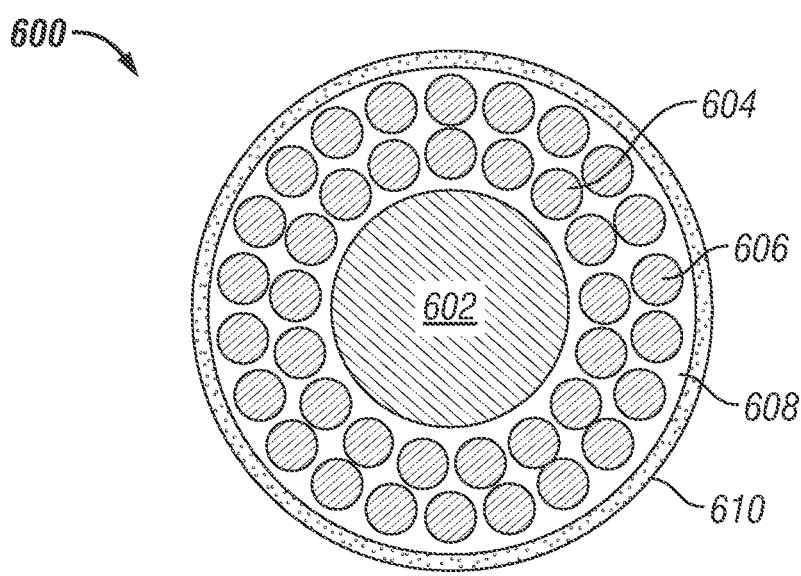
FIG. 6 is a cross-sectional representation of a cable of the invention, which has an outer jacket formed from a polymeric material including short fibers, and where the outer jacket surrounds a polymeric material layer.

FIG. 6 illustrates yet another embodiment of a cable of the invention, which has a polymeric jacket including short fibers. Cable 600 includes at least one insulated conductor 602 in the core, a polymeric material 608 contiguously disposed in the interstitial spaces formed between armor wire layers 604 and 606, and interstitial spaces formed between the armor wires 604 and insulated conductor(s) 602. The polymeric material 608 may extend beyond the outer armor wires 606 to form a polymeric jacket. The cable 600 includes an outer jacket 610, bonded with polymeric material 608, and encasing the cable. The outer jacket 610 is formed from a polymeric material that also includes short fibers. The polymeric material 608 may optionally be free of any short fibers or particles.

Figure 7:
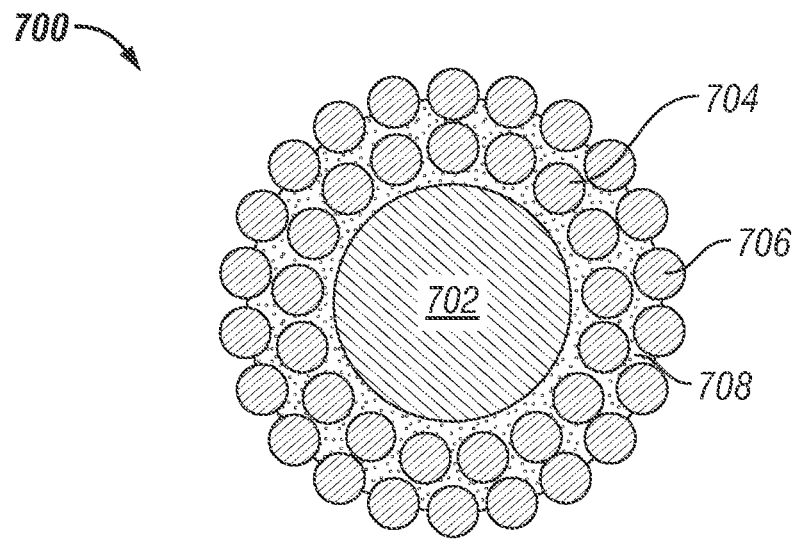
FIG. 7 is a cross-section illustration of a cable according to the invention which includes a polymeric material partially disposed about the outer armor wires.

In some cables according to the invention, the polymeric material may not necessarily extend beyond the outer armor wires. Referring to FIG. 7, which illustrates a cable with polymeric material partially disposed about the outer armor wires, the cable 700 has at least one insulated conductor 702 at the core position, a polymeric material 708 disposed in the interstitial spaces formed between armor wires 704 and 706, and interstitial spaces formed between the inner armor wires 704 and insulated conductor(s) 702. The polymeric material is not extended to substantially encase the outer armor wires 706.

Figure 8:
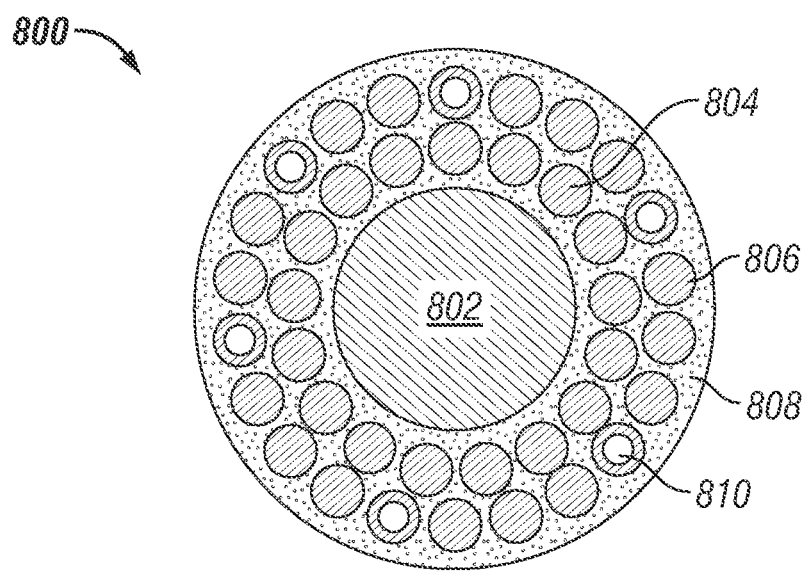
FIG. 8 is a cross section which illustrates a cable which includes coated armor wires in the outer armor wire layer.

Coated armor wires may be placed in either the outer and inner armor wire layers, or both. Including coated armor wires, wherein the coating is a polymeric material as mentioned hereinabove, may improve bonding between the layers of polymeric material and armor wires. The cable represented in FIG. 8 illustrates a cable which includes coated armor wires in the outer armor wire layer. Cable 800 has at least one insulated conductor 802 at the core position, a polymeric material 808 disposed in the interstitial spaces and armor wires 804 and 806, and interstitial spaces formed between the inner armor wires 804 and insulated conductor(s) 802. The polymeric material is extended to substantially encase the outer armor wires 806. The cable further comprises coated armor wires 810 in the outer layer of armor wires.

Figure 9:
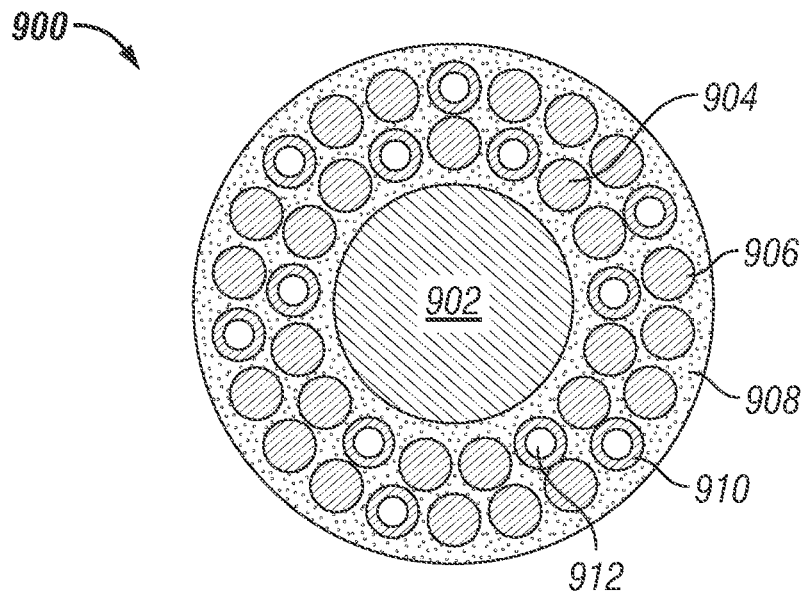
FIG. 9 is a cross section which illustrates a cable which includes a coated armor wires in the inner and outer armor wire layers.

Referring to FIG. 9, a cable that includes coated armor wires in both inner and outer armor wire layers, 910 and 912. Cable 900 is similar to cable 800 illustrated in FIG. 8, comprising at least one insulated conductor 902 at the core position, a polymeric material 908 disposed in the interstitial spaces, armor wires 904 and 906, and the polymeric material is extended to substantially encase the outer armor wires 906 to form a polymeric jacket thus encasing and sealing the cable 900.

Figure 10:
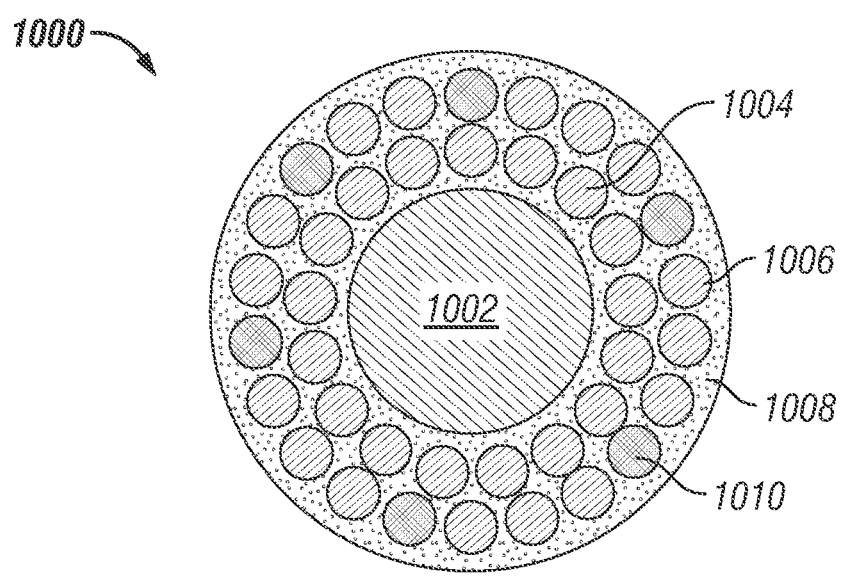
FIG. 10 is a cross section illustrating a cable which includes filler rod components in the outer armor wire layer.

Referring to FIG. 10, a cable includes filler rod components in the armor wire layer. Cable 1000 includes at least one insulated conductor 1002 at the core position, a polymeric material 1008 disposed in the interstitial spaces and armor wires 1004 and 1006. The polymeric material 1008 is extended to substantially encase the outer armor wires 1006, and the cable further includes filler rod components 1010 in the outer layer of armor wires. The filler rod components 1010 include a polymeric material coating which may further enhance the bond between the filler rod components 1010 and polymeric material 1008.

Cables may include armor wires employed as electrical current return wires which provide paths to ground for downhole equipment or tools. The cables enable the use of armor wires for current return while minimizing electric shock hazard. In some embodiments, the polymeric material isolates at least one armor wire in the first layer of armor wires thus enabling their use as electric current return wires.

The present invention is not limited, however, to cables having only metallic conductors. Optical fibers may be used in order to transmit optical data signals to and from the device or devices attached thereto, which may result in higher transmission speeds, lower data loss, and higher bandwidth.

Cables may be used with wellbore devices to perform operations in wellbores penetrating geologic formations that may contain gas and oil reservoirs. The cables may be used to interconnect well logging tools, such as gamma-ray emitters/receivers, caliper devices, resistivity-measuring devices, seismic devices, neutron emitters/receivers, and the like, to one or more power supplies and data logging equipment outside the well. Cables may also be used in seismic operations, including subsea and subterranean seismic operations. The cables may also be useful as permanent monitoring cables for wellbores.

For wellbores with a potential well head pressure, flow tubes with grease pumped under pressure into the constricted region between the cable and a metallic pipe are typically used for wellhead pressure control. The number of flow tubes depends on the absolute wellhead pressure and the permissible pressure drop across the flow tube length. The grease pump pressure of the grease is typically 20% greater than the pressure at the wellhead. Cables may enable use of pack off devices, such as by non-limiting example rubber pack-offs, as a friction seal to contain wellhead pressure, thus minimizing or eliminating the need for grease packed flow tubes. As a result, the cable rig up height on for pressure operations is decreased as well as down sizing of related well site surface equipment such as a crane/boom size and length. Also, the cables with a pack off device will reduce the requirements and complexity of grease pumps as well as the transportation and personnel requirements for operation at the well site. Further, as the use of grease imposes environmental concerns and must be disposed of based on local government regulations, involving additional storage/transportation and disposal, the use of cables may also result in significant reduction in the use of grease or its complete elimination.

As some cables used are smooth, or slick, on the outer surface, frictional forces (both with wellhead equipment and cable drag) are significantly reduced as compared with similar sized armored logging cables. The reduced friction would make possible the ability to use less weight to run the cable in the wellbore and reduction in the possibility of vortex formation, resulting in shorter tool strings and additional reduction in the rig up height requirements. The reduced cable friction, also known as cable drag, will also enhance conveyance efficiency in corkscrew completions, highly deviated, S-shaped, and horizontal wellbores.

As traditional armored cables tend to saw to cut into the wellbore walls due to their high friction properties, and increase the chances of differential pressure sticking ("key seating" or "differential sticking"), the cables reduces the chances of differential pressure sticking since the slick outer surface may not easily cut into the wellbore walls, especially in highly deviated wells and S-shaped well profiles. The slick profile of the cables would reduce the frictional loading of the cable onto the wellbore hardware and hence potentially reduce wear on the tubulars and other well bore completion hardware (gas lift mandrels, seal bore's, nipples, etc.).

Referring now to FIGS. 11a-11b and 12a-12b, a cable, such as the cable 100, 200, 300, 400, 500, 600, 700, 800, 900, or 1000, is shown generally at 1100 in FIG. 11b. Often, well-bore tubing 1102 that is inserted into the oilfield wells is typically formed from a material that are corrosion resistant, such as a nickel based material or a cobalt based material. Alternatively, the tubing 1102 material includes a coating 1104 on the interior diameter thereof by a preferably corrosion resistant material such as, but not limited to, chrome, glass reinforced epoxy, poly vinyl chloride and various additional plastic based coatings or other corrosion resistant materials. These coatings are typically relatively thin, such as a few millimeters and can be abraded away with constant contact with an armored wireline cable 1101, best seen in FIG. 11a. The smooth outer coating of the cable 1100 advantageously minimizes the abrasion of the internal diameter of the tubing 1102 any coatings 1104 thereon.

Alternatively, the cable 1100 may be utilized with a tubing 1202 in oilfield well bores may be formed from standard carbon steels or low alloy steels in cases when the life expectancy of the well is not very long. These materials, however, are highly susceptible to corrosion. To avoid the premature failure of these tubing 1202, a lining 1204, typically formed from reinforced fiberglass or the like is inserted in the tubing 1202. A traditional armored wireline logging cable 1101 can abrade away the material of the lining 1204 and disadvantageously expose the underlying steel tubing 1202 to the effects of corrosion damage. The smooth outer coating of the electrical cable 1200 will have the potential of not completely abrading away the material of the lining 1204 and hence increase the longevity in the wells.

Figure 19:
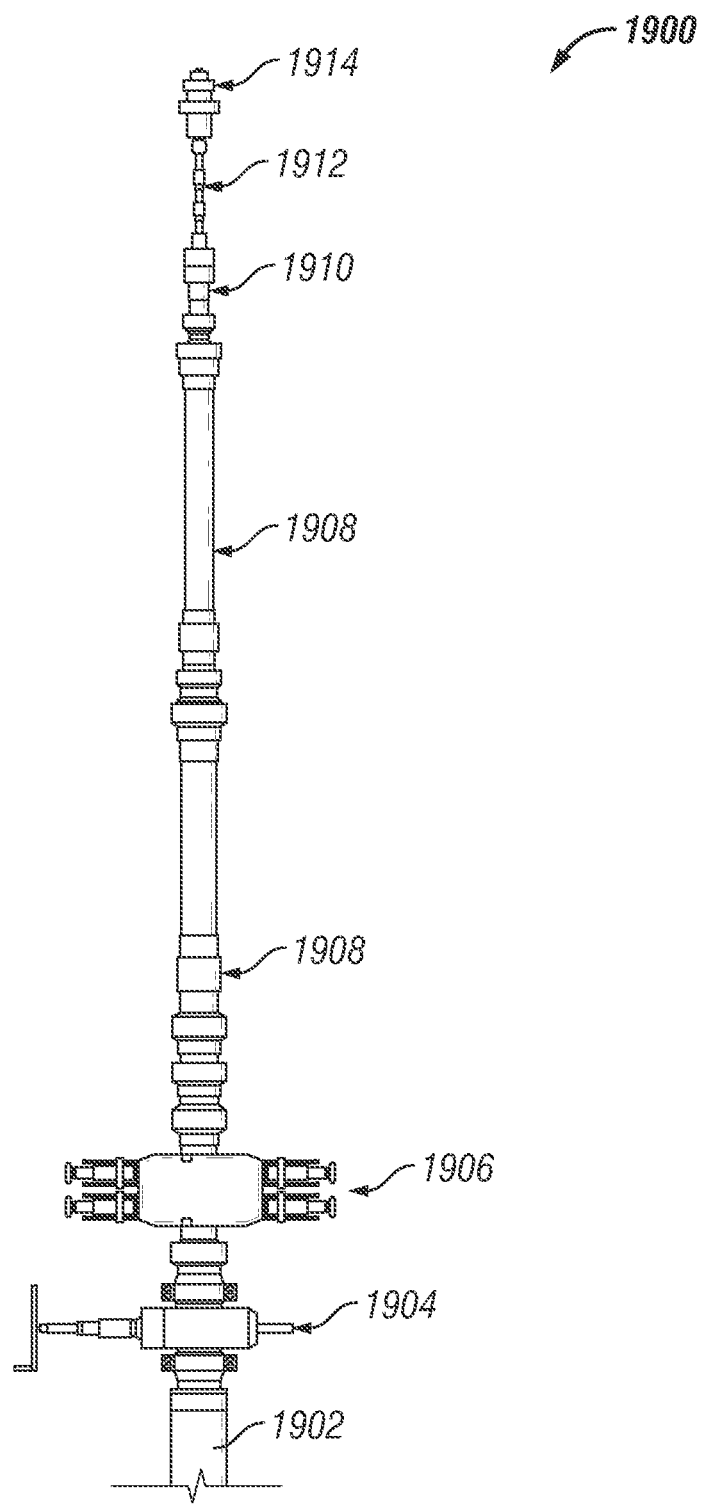
FIG. 19 is a schematic perspective view of wellhead pressure control equipment.

In another embodiment, a cable, such as the cable 100, 200, 300, 400, 500, 600, 700, 800, 900, or 1000, may be utilized in a method during staged fracturing jobs. During multi-stage fracturing and wireline/slickline logging, the well is typically either equipped with pressure control wellhead equipment to control the pressure that is released during the fracturing. Referring to FIG. 19, a typical pressure control wellhead equipment 1900 for controlling pressure from a wellhead 1902 comprises, in series, a BOP 1904 adjacent the wellhead 1902, at least one wireline valve(s) 1906, a lubricator(s) or riser(s) 1908, a tool or head catcher(s) 1910, a flow tube(s) 1912, and a stuffing box 1914. In cases where there is no allowance to set up the wellhead equipment, the pressure in the well is typically significantly lowered by pumping in fluids (especially water). Once the water is pumped in and the wellhead pressure is lowered, wireline logging can be undertaken using pack-off type of wellhead equipment. The pumping in of water has two main disadvantages (1) time consumption, and (2) possibility of losing the well integrity by changing the invasion area close to the fractured zone. With the use the enhanced electrical cable such as the cable 100, 200, 300, 400, 500, 600, 700, 800, 900, or 1000, there would not be any necessity to lower the pressure by pumping in water or any necessity to use pressure control well head equipment 1900 and the wellhead, such as the wellhead 1902, can be advantageously equipped with just a pack-off and the multistage fracturing and logging jobs can be undertaken, which may result in a time savings of about 3 hours per stage depending, of course, on the complexity of the job.

Referring now to FIG. 13a-13c, a cable, such as the cable 100, 200, 300, 400, 500, 600, 700, 800, 900, or 1000, is indicated generally at 1300 in FIG. 13c. When logging wells with high fluid flow in the annulus 1302 and the tubing 1304 fixed at surface and a packer (not shown) below, a corkscrew effect on the tubing 1304 may be experienced. Metallic production tubing 1304, when inserted into the well bore, are typically fixed at the surface and at the bottom by a packer 1306. During the flowing of the well (either gas or oil), the temperature increases and this thermally expands the tubing 1304. Since the tubing 1304 has its ends fixed, it buckles and forms a corkscrew shaped profile, best seen in FIGS. 13b and 13c. The pressure difference and the turbulent flow the fluid may also contribute to this effect, which can cause increased friction due to increased number of contact points, and a capstan effect, wherein the armored logging cable 1101 can torque inside the well and possibly birdcage. The cable 1300, best seen in FIG. 13c, can provide significant reduction in friction with the corkscrew shaped tubing 1302 and hence does not necessarily require additional weight to lower the cable and/or tool (not shown) inside the wellbore 1306. The robust jacket or the cable 1300 can prevent the manifestation of the torque thereon and thereby minimize the capstan effect on the cable 1300.

Figure 14:
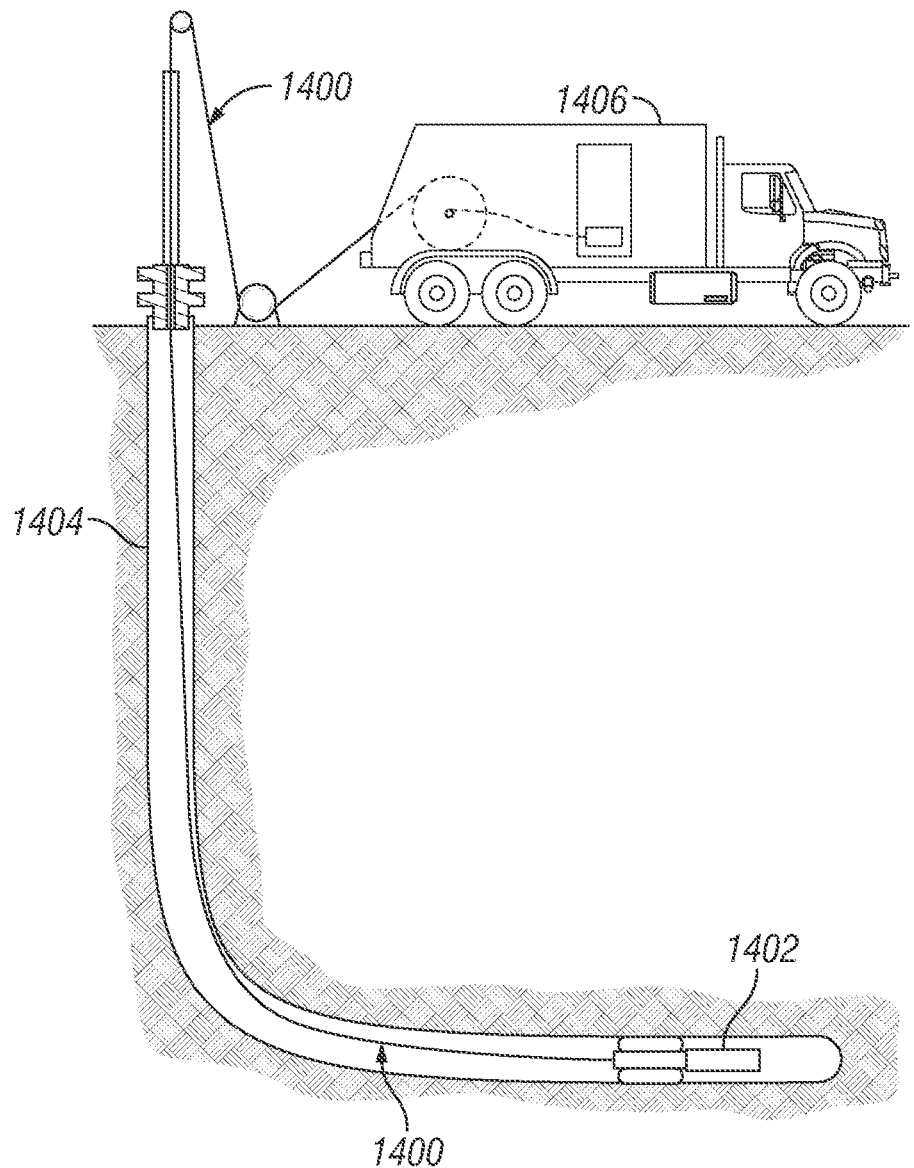
FIG. 14 is a schematic view of a cable disposed in a wellbore and having a tractor attached thereto.

Referring now to FIG. 14, a cable, such as the cable 100, 200, 300, 400, 500, 600, 700, 800, 900, or 1000, is indicated generally at 1400. During tractoring (when a cable has a tractor 1402 attached to the end of the cable 1400 when deployed in a wellbore or borehole 1404), it is desirable to reduce the weight the tractor 1402 drags behind it, which prevents the motor(s) in the tractors from excessive work. When the cable 1400 is deployed in a horizontal, deviated, or dog-legged well, there are friction or contact points as determined by the geometry of the wellbore 1404. The tractoring operation can be made more efficient by the use of the cable 1400, since the total friction reduction is significant between the cable 1400 and borehole 1404, as compared to a traditional armored wireline cable 1101. The drag force on the cable 1400 is significantly lower since there is a smooth jacket on the outside of the cable 1400, which allows for reduced load requirements at the tractor 1402. In addition, friction is key factor in reducing the surface pull (and thereby horsepower required) by the surface equipment 1406. A friction factor of 0.3 versus 0.25 makes a significant change in the logging characteristics and would allow the logging of certain wells that would not have been possible with the higher friction factor. The lowering of the friction achieved by the enhanced electrical cable 1400 may be to 40%.

Figure 15A:
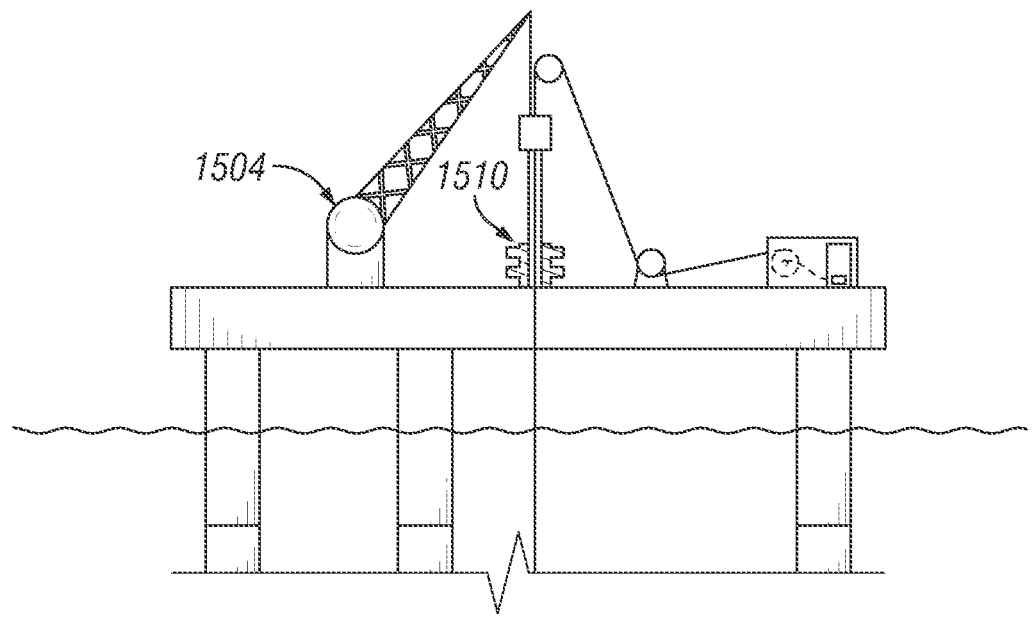
FIGS. 15a and 15b are schematic views, respectively, of a cable deployed in a well utilizing surface equipment.
Figure 15B:
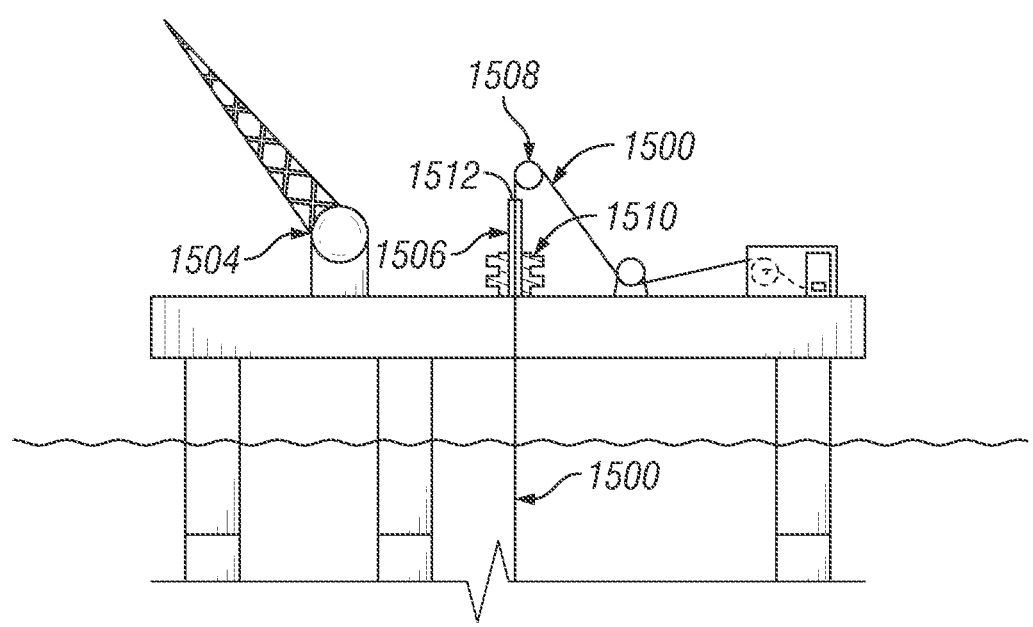

Referring now to FIGS. 15a and 15b, a cable, such as the cable 100, 200, 300, 400, 500, 600, 700, 800, 900, or 1000, is indicated generally at 1500. Many offshore platforms require a means of supporting the wellhead equipment 1502 when performing a wireline operation without the use of the drilling derrick (not shown). Cranes 1504, best seen in FIG. 15a, are one means of doing this, but under several criteria (safety case, requirement for crane to be available for other operations) which are not always practical. A mast unit or other temporary derrick (not shown) may be used but this increases logistical complexity and may not be physically possible. A standard wireline rig up offshore may require a crane 1504 or mobile mast unit (not shown) to support both the upper sheave wheel and the pressure equipment itself. With the use of a pack off assembly 1506, best seen in FIG. 15b, rather than flow tubes, it may be possible to use a more conventional slick line style upper sheave 1508 mounted to the well head equipment 1510 itself at the top of the lubricator 1512. With a suitably specified lubricator, with regard to loading, this lubricator could be made to be self-supporting. Hence the crane 1504 would only be required to rig onto the well and rig off the wireline equipment and during the actual operation, the lubricator would be advantageously self-supported.

Figure 16A:
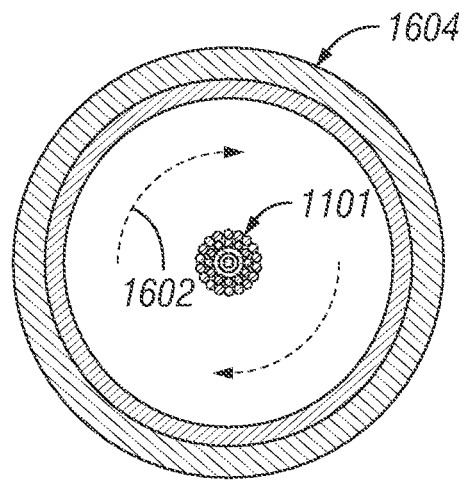
FIGS. 16a and 16b are radial cross-sectional views, respectively, of a cable disposed in a wellbore having fluid flowing thereby.
Figure 16B:
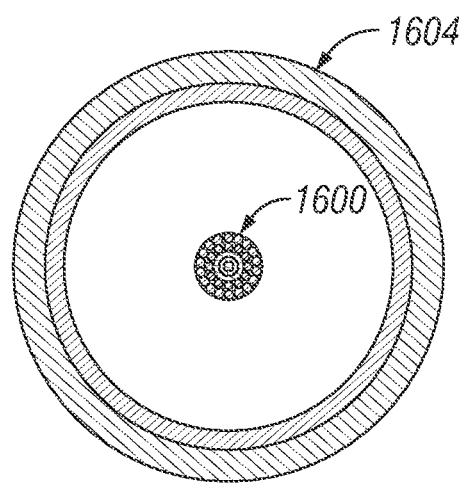

Referring now to FIGS. 16a and 16b, a cable, such as the cable 100, 200, 300, 400, 500, 600, 700, 800, 900, or 1000, is indicated generally at 1600 in FIG. 16b. During logging wells 1604 with high flow rate of a fluid, the armored logging cable 1101 acts like a screw because due to the helical profile of the armor wires, the fluid forms a vortex around the cable 1101, indicated by arrows 1602. The vortex creates additional resistance for cable movement into the well and may be severe enough to create cavitations at the cable 1101 and hence potentially introduce torque in the cable 1101. The cable 1600, which has a robust smooth outer profile and advantageously does not allow the formation of the vortex.

Figure 17A:
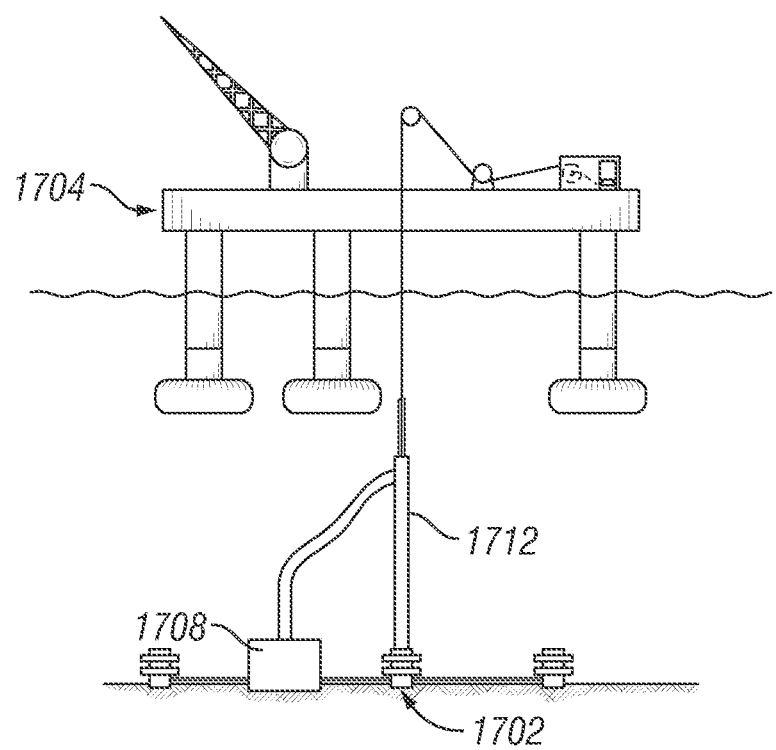
FIGS. 17a and 17b are schematic views, respectively, of methods for deploying a cable into a subsea wellbore.
Figure 17B:
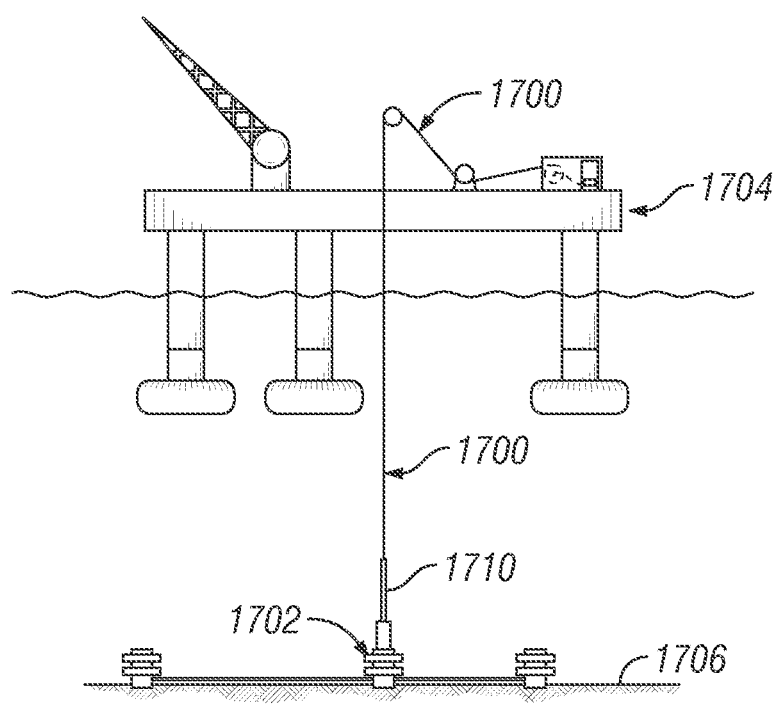

Referring now to FIGS. 17a and 17b, a cable, such as the cable 100, 200, 300, 400, 500, 600, 700, 800, 900, or 1000, is indicated generally at 1700 in FIG. 17b. Subsea production is increasing in frequency and the requirement to be able to perform interventions in these wells becomes greater. Several systems have been designed that use a lubricator system lowered onto the sub sea well head 1702, using grease injection into flow tubes to establish a dynamic pressure seal, with the cable returning through open water back to surface on the intervention vessel (not shown) or the rig/platform 1704. For shallow water applications, the grease injection system, including the grease tank, can be installed on the vessel or rig/platform 1704, and pressurized grease can be conveyed to the grease head at the seabed 1706 through a control umbilical (not shown) or through a dedicated hose (not shown). For well intervention operations with a subsea lubricator in deep water, it becomes difficult to have the grease injection system on the vessel, and the whole injection system 1708 is placed subsea, as shown in FIG. 17a, which implies significant technical challenges and additional cost and complexity of the whole system. The use of the cable 1700 significantly eases the complexity requirements and design of such a subsea system, replacing the flow tubes and grease injection system with a pack-off type dynamic seal (also called a stuffing box) 1710 and thereby eliminating the need for a set of flow tubes 1712 as part of the injection system 1708. Additionally, the cable 1700 will be cleaned of grease in a far better manner than compared to a conventional line wiper and stranded cable 1101. The use of the cable 1700 will reduce stranded cable incidents, making the subsea intervention a significantly less risky affair, and a more reliable operation.

Figure 18:
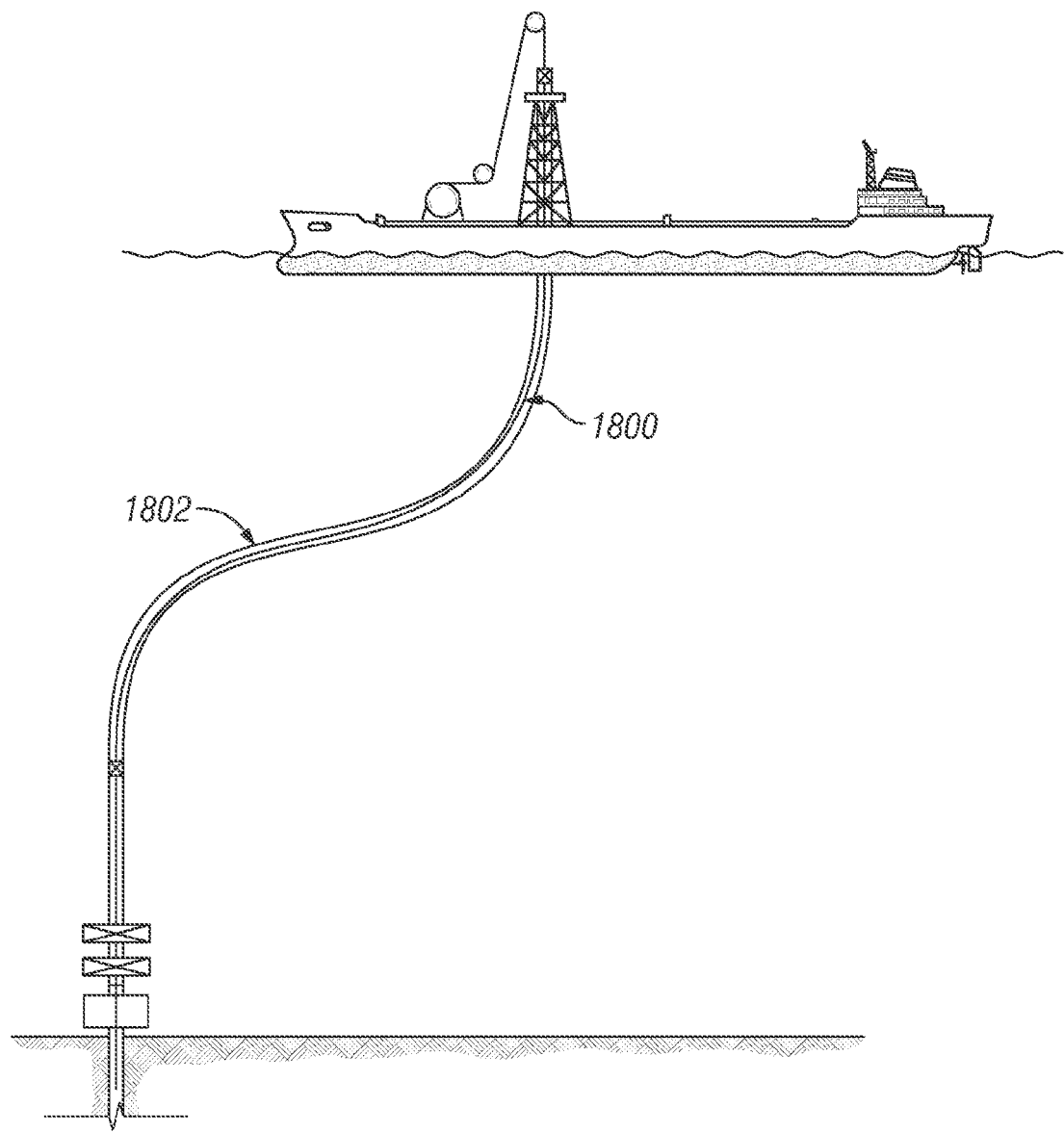
FIG. 18 is a schematic view of a method for deploying a cable into a subsea wellbore.

Referring now to FIG. 18, a cable, such as the cable 100, 200, 300, 400, 500, 600, 700, 800, 900, or 1000, is indicated generally at 1800. The use of the cables 1800 in combination with a described above in combination with a spoolable compliant guide system, indicated at 1802 also brings significant advantages. In this configuration, once the need for a grease injection system is eliminated by the use of cables described above, it is conceivable to have a pack-off type dynamic seal which is retrievable through the compliant guide 1802, as described in more detail in commonly assigned U.S. Pat. Nos. 7,845,412 and 8,387,701, each of which are incorporated by reference herein in their entirety. Having such a retrievable dynamic seal with a standard braided cable 1101 would likely not be possible, since grease injection would be required to establish a proper pressure barrier, and it would be quite difficult to have an effective grease injection system which could also be deployed and retrieved through the spoolable compliant guide 1802. The "slick" coating of the cable 1800 will bring some additional advantages as well to operations through the spoolable compliant guide system 1802 including, but not limited to, reduced "wireline cutting" effect wherein the smooth surfaces of the enhanced electrical cable 1800 where a stranded cable 1101 running up and down an S-shaped tubular would generate abrasions and grooves on the inner sides of the bends. The use of the cable 1800 will also provide a reduced capstan effect wherein the slick exterior surface of the cable 1800 will produce a smaller friction coefficient, which will in turn reduce the friction losses due to the capstan effect experienced by the cable while going through the bends of the spoolable compliant guide system 1802. The capstans effects can introduce significant tension losses for a standard braided cable 1101, which would drastically reduce the intervention capabilities of the system in terms of maximum well depth and deviation in which tools can be conveyed.

The use of the cable 1700 or 1800 advantageously simplifies the design of a subsea dynamic seal by eliminating the grease injection system due to the slick surfaces of the cable 1700 or 1800. The cable 1700 or 1800 may advantageously be applied to a pack-off type of dynamic seal to seal on electrical cables (or other cables with "slick" surfaces) during so called "open water" operations, i.e. when the wireline is conveyed in open water from the vessel to the subsea lubricator or other subsea installation.

The cable 1700 or 1800 may also be utilized with a pack-off type of dynamic seal to seal on electrical cables (or other cables with "slick" surfaces) during operations with the spoolable compliant guide system 1802, i.e. when the wireline is conveyed through the spoolable compliant guide 1802 and the dynamic seal is deployed through the guide itself together with the intervention toolstring (through a guide retrievable dynamic seal (not shown). The use of the cable 1800 with the spoolable compliant guide system 1802 reduces friction, resulting in a reduced capstan effect and reduced wireline cutting effect.

The use of the cable 1700 or 1800 advantageously allows the use of a pack-off type of dynamic seal to seal on the electrical cable 1700 or 1800 during subsea intervention operations performed through other types of tubulars connecting the surface vessel with the subsea installation, including, but not limited to, drilling risers, workover risers, completion risers, flexible risers, tensioned risers, high pressure risers, production risers, flowlines, jumpers, coiled tubing, umbilicals or any other kind of tubular through which an enhanced cable could be conveyed to perform any kind of intervention.

Yet other embodiments of methods include logging with the cable, such as the cable 100, 200, 300, 400, 500, 600, 700, 800, 900, or 1000 while a fluid is injected in the well. The cable provides a number of significant advantages with regard to running in a well when a fluid or gas is being injected in the well. Some examples of the advantages include reduced tension on the cable during high flow injection. For example, the use of the cable would result in an overall reduction in cable tension induced by high flow rates pumped into a well, such as on a fracturing job, or when logging a high rate injection well, which would allow higher flow rates to be logged with still an acceptable safety margin.

In addition, the use of the cable, such as the cable 100, 200, 300, 400, 500, 600, 700, 800, 900, or 1000, may provide protection of the wireline cable when it enters the interior diameter of drill pipe in a Tough Logging Conditions (TLC) Cable Side Door Entry Sub. An issue with conventional cables in this situation is that they can become easily washed out by flow as the cable enters the pipe. A work around is to ensure the cable is constantly moving but this can make the operation more difficult. The enhanced electrical cable would be able to prevent this washing out and hence make the operation safer.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values. Accordingly, the protection sought herein is as set forth in the claims below.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A method of deploying a cable into a wellbore penetrating a subterranean formation, the method comprising:
   a. providing a cable, wherein the cable comprises:
      (i) an insulated conductor;
      (ii) an armor wire layer surrounding the insulated conductor, wherein the armor wires forming the armor wire layer comprise:
         a central filament,
         at least three (3) filaments helically disposed adjacent the central filament, and
         a polymer jacket encasing the central filament and filaments disposed adjacent the central filament; and
      (iii) a polymeric material disposed in interstitial spaces formed between the armor wires forming the armor wire layer, and in interstitial spaces formed between the armor wire layer and the insulated conductor;
   b. introducing the cable into a wellbore; and
   c. performing at least one operation in the wellbore utilizing the cable.

2. The method of claim 1, wherein the cable comprises an inner armor wire layer and an outer armor wire layer.

3. The method of claim 1, wherein the armor wires forming the armor wire layer are bimetallic armor wires, GIPS armor wires, or strength members formed of a plurality of stranded filaments.

4. The method of claim 1, wherein the cable further comprises an outer jacket disposed around the polymeric material, wherein the outer jacket is bonded with the polymeric material to form a smooth outer jacket.

5. The method of claim 1, wherein performing comprises performing a logging operation.

6. The method of claim 5, wherein the logging operation is performed concurrent with injection of fluid or gas into the wellbore.

7. The method of claim 5, wherein the logging operation is performed on a subsea formation and wherein a crane is not utilized for introduction of the cable into the wellbore.

8. The method of claim 5, wherein the logging operation is performed on a wellbore with high fluid flow and severe vortex formation, whereby cavitations and torque effects placed upon the cable are significantly minimized.

9. The method of claim 1, wherein performing comprises performing a multi-stage fracturing operation.

10. The method of claim 9, wherein the cable is inserted into a tubular and at least one pack-off is used to seal an annulus formed between the cable and the tubular.

11. The method of claim 1, wherein the operation is performed on a subsea formation, and wherein the cable is inserted into a tubular and whereby at least one pack-off is used to seal an annulus formed between the cable and the tubular.

12. The method of claim 1, wherein the operation is performed using a tractor attached to the cable, whereby the cable has reduced friction with the wellbore wall.

13. The method of claim 1, wherein the wellbore comprises a casing with a coated inner surface, whereby abrasion of the coating by the cable is reduced.

14. The method of claim 1, wherein the wellbore comprises a casing with a glass fiber inner lining, whereby abrasion of the inner lining by the cable is reduced.

* * * * *